United States Patent

Irwin

[15] 3,641,534

[45] Feb. 8, 1972

[54] INTRARECORD RESYNCHRONIZATION IN DIGITAL-RECORDING SYSTEMS

[72] Inventor: John W. Irwin, Longmont, Colo.

[73] Assignee: International Business Machines Corporation, Armonk, N.Y.

[22] Filed: Dec. 29, 1969

[21] Appl. No.: 888,766

[52] U.S. Cl. ....................340/174.1 A

[51] Int. Cl. ....................G11b 5/02

[58] Field of Search ..............340/174.1 R, 174.1 A, 174.1 B, 340/174.1 H

[56] References Cited

UNITED STATES PATENTS

| | | | |
|---|---|---|---|
| 3,423,744 | 1/1969 | Gerlzch et al. | 340/174.1 G |
| 3,277,246 | 10/1966 | Altonji | 340/174.1 G |
| 3,377,583 | 4/1968 | Sims, Jr. | 340/174.1 G |
| 2,782,398 | 2/1957 | West et al. | 340/174.1 G |

*Primary Examiner*—Stanley M. Urynowicz, Jr.
*Assistant Examiner*—Vincent P. Canney
*Attorney*—Hanifin and Jancin and Herbert F. Somermeyer

[57] ABSTRACT

In a block of recorded data, resynchronization signals are interleaved among sets or subblocks of digital data signals for enabling reestablishment of self-clocking in a dead track. Resynchronization occurs within a block of recorded data. In a multitrack system, requeuing the dead track in the skew buffers (SKB) is accomplished by placing the dead track SKB position at maximum leading relationship to the most lagging active track. If data signals from the previously dead track are received by SKB before the dead track has reached maximum lagging relationship, the previous dead track is activated for normal operation. Otherwise, the dead track is returned to dead-tracking status. The readout counter (ROC) of SKB controls read-back operations and determines signal format on the record media.

59 Claims, 13 Drawing Figures

INVENTOR
JOHN W. IRWIN

BY [signature]

ATTORNEY

INTRARECORD RESYNCHRONIZATION IN DIGITAL-RECORDING SYSTEMS

BACKGROUND OF THE INVENTION

The present invention relates to moving magnetic media recording systems and, particularly, to a self-clocking resynchronization system and method for use within blocks of magnetically recorded data signals.

The design and method of operating magnetic recording systems is usually a compromise between reliability and increasing data throughput. Users of magnetic recording systems often sacrifice throughput to decrease the number of permanent errors. Such reduction in permanent errors in the recording system for a given amount of data to be recorded has been accomplished by dividing the data into small blocks of recorded signals. Since, in present-day tape systems, a minimum spacing is usually provided between successive blocks of data, such approach not only reduces the available tape recording area in a given tape but also reduces the throughput of the system.

In higher density recording systems (1,000 bits per inch and more), it is practically a necessity that each track of data on a recording medium be characterized such that it can be self-clocking. The reason for this arrangement is that the cell in such a recording system is extremely short along the length of the media. Without self-clocking, data probably could not be successfully recovered. For successful self-clocking, it is desirable that the clock in the readback system be synchronized to the data as read from the tape every short distance of travel of the tape. To facilitate such resynchronization, it is desirable to have predetermined flux transitions occur in the recording at least once during a short length of tape. This can be accomplished either by inserting synchronization transitions between small sets of data signals or by utilization of a storage code having such transitions. The characteristics of such clock-synchronizing signals are such that the phase of the clock can be maintained, but that the frequency and phase-synchronizing and position-indicating components thereof are insufficient to enable a clock that is out of synchronization to start proper operation.

The problems stated above are caused by present-day magnetic media recording systems having no facile method of resyncing within a block of data signals after a defect in the tape or lift-off has occurred; that is, after a signal has been lost from a given track. Such magnetic media recording systems continue in a degraded mode of operation; that is, without data signals from the defective (dead) track, throughout the remainder of the record block. Therefore, it is highly desirable that a magnetic media system should be able to resync within a block of data. To date, this has not been practical because, when data is recorded, there is a randomness of the recorded signal in accordance with information represented. Such randomness does not have predictable frequency and phase components nor precise position information such as to enable such resynchronization.

SUMMARY OF THE INVENTION

It is the prime object of the present invention to provide high-density digital data recording in blocks of data having a capability of resynchronizing a dead track on-the-fly within any block of such data.

A recording system using the present invention includes recording a set of data signals, then recording a set of resynchronization signals having predetermined signal phase and frequency-synchronizing and position-indicating components and repeating such recording steps until all data in one block has been recorded. Marker signals may be used to mark the boundary between the synchronizing and data signals, especially if the resynchronization signals are a valid form of recorded data.

A block of such recorded data is usually characterized by a preamble set of synchronization signals, a marker signal, then alternate sets of data signals, marker signals and resynchronization signals, and, finally, a postamble set of synchronization signals. The postamble enables reading the data block in a reverse direction. Padding signals may be added to one of the sets of data signals within the block such that all sets of data signals have the same number of digit positions or the same remainder when divided by the number of readout counter (ROC) states. The second method does not require padding in excess of the number of ROC states and therefore makes a more efficient use of the media. Marker signals may again mark the boundary between such signals and the padding signals within such sets of data signals.

A multitrack recording system usually has deskewing apparatus; that is, electronic circuitry capable of randomly receiving signals from a magnetic media wherein the signals from one track lead or lag signals from another track. The deskewing apparatus realigns the data into bytes for processing by other apparatus. According to a feature of the present invention, a dead track is resynchronized and requeued into the deskewing apparatus by artificially making the dead track position in a deskewing apparatus at maximum leading position. As data from the track being resynchronized is introduced into the deskewing apparatus, requeuing occurs. However, if the dead track position reaches maximum lagging position in the deskewing apparatus, the dead track may be returned to dead-track status until the next set of synchronizing signals is received. Then, resynchronization is again attempted. The interleaving of resynchronization signals with data signals within the data block not only provides for automatic resynchronization but also the requeuing of a dead track in a read-back system.

In a broad aspect of the invention, any suitable synchronization signal may be interleaved with data signals to enable the described resynchronization. To reduce costs, it is preferred that resynchronization signals interleaved with data signals have the same characteristics and length as the preamble and postamble synchronization signals. Since many preambles and postambles are strings of 1's or 0's, a specific feature of the invention provides resynchronization signals within a block of data as a string or burst of "1" or "0" signals. Bursts of any signal combinations may be used.

The present invention may be practiced either in a programmed general purpose machine (such as a microprogrammed machine), a completely hardware-provided set of sequences, or a combination of the two. An example of a suitable microprogrammed control unit is the IBM 2841 microprogrammable control unit.

Another feature is the utilization of the deskewing counter (ROC) as a control counter in a recording system. Data addressing may be accomplished with this feature. Formatting of recording is based on an integral number of rotations (ROC cycles completely through all of its possible signal states in each rotation) of the deskewing counter. Symmetrical formatting is preferred for enhancing bidirectional reading. This format preferably includes symmetrically recorded resync signals. In this regard, the number of processed signal bytes is tallied for determining the length of a set of signals. ROC may be a part of such a counter.

In one form of the invention, resynchronization is based upon detection of resync signals written as bytes in plural tracks on the recording media. The resync signal then has a length of not less than twice the maximum compensible skew in the recording system. When the resync signal in each track provides track position information independent of similar signals recorded in other tracks, the resync signal need not be such length. Requeuing of the previously dead track in the deskewing apparatus of the system may use those features of the present invention; for example, making the dead track effectively appear as the most leading track at the onset of resync attempts while the most lagging at the extreme end of an unsuccessful resync attempt.

The foregoing and other objects, features and advantages of the invention will be apparent from the following more particular description of a preferred embodiment of the invention, as illustrated in the accompanying drawings.

Figure 1:
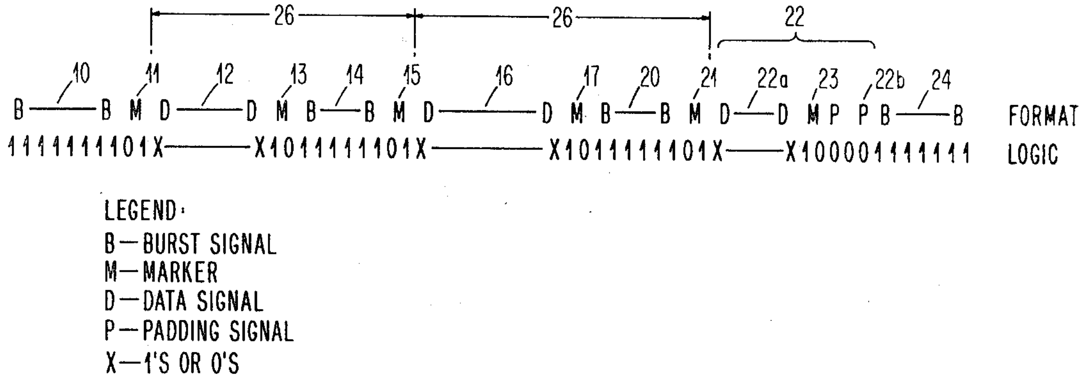
FIG. 1 is a simplified diagrammatic presentation of a single track of data recorded in accordance with the teachings of the present invention. The illustrated format facilitates reading in either direction and provides intrablock resynchronization in either direction of reading.

Referring now more particularly to the drawings, like numerals indicate like parts and structural features in the various diagrams. It is to be understood that the illustrations of signal flow diagrams and the operation flow charts are to be interpreted as including functional representations of microprograms in a general purpose programmable machine usable to accomplish the functions and operations described herein. Since programmable machines can take various forms and are well known and the programming of same to accomplish the described functions can be varied, no detailed description of a particular program is included. A programmer of ordinary skill can construct a program for practicing the present invention based upon the operation flow charts.

RECORDING SCHEMES

It is well known that there are many types of systems for recording digital data, particularly on magnetic media. The present invention may be practiced with any form of recording on any media. While techniques of recording in various recording systems may vary somewhat in accordance with the characteristics thereof, the implementation of this invention may be varied to accommodate such variations. For example, synchronization signals usable with various recording schemes often take different forms. Phase encoded recordings usually utilize synchronization signals consisting of bursts of recorded 0's. Padding within a data block to make the length of the data block a predetermined number of signals or digit positions consists of a string or burst of recorded 1's. Phase encoding is well known, and the signal representation of 0's and 1's is likewise known. On the other hand, variations of such phase encoding may utilize bursts of 1's for synchronization signals and bursts of 0's for padding in a data block.

U.S. Pat. No. 3,217,183, issued to L. H. Thompson et al., describes a variation of phase encoded recording. Another reference of interest is an article by R. C. Franchini on page 112 of the IBM Technical Disclosure Bulletin, July 1967.

In most magnetic-recording systems, the recording of data occurs only in one direction of tape motion. In accordance therewith, there is a beginning or end to each data block. Synchronization signals disposed at the beginning and end of the block, respectively, are termed the preamble and postamble. However, in many magnetic-media systems, reading can occur in both directions.

Another recording scheme is NRZI in which a flux transition on the record represents a binary 1 and no flux transition a binary 0. In NRZI recording, the record is divided into cells, each capable of recording one bit of binary data. Synchronization signals in NRZI recording are a burst of 1's. For self-clocking purposes, an additional clock-synchronizing signal may be periodically recorded among the data signals.

The recording schemes described above, as well as other recording schemes not described herein, can be modified by limiting the sequence (run) of recorded signals to predetermine maximum lengths of 1's or 0's or both. In such systems, the data to be recorded is converted into a storage code usually containing a greater number of signals than is usually used to represent a byte of data. For example, seven bits of data received by a recording system can be converted into a set of eight signals. The characteristics of the eight signals are predetermined such as to limit the bandwidth of the recording signals, (i.e., the maximum number of 1's or 0's in a string). It also may require that flux transitions of a certain character occur at least once in a small number of cells. The usage of such predetermined flux transitions will be described later. It is known that the conversion of data representable by such run-length limited codes enhances the recording and read-back in magnetic-media systems. The utilization of storage codes as substitutions for data-processing codes can be successfully used in practicing the present invention.

As used herein, the words "write" and "record" are interchangeably used to designate recording signals on a storage media. Similarly, the words "read," "read back," and "sense" are interchangeably used to designate recovery of recorded signals from a storage media and conversion to appropriate digital signals.

RECORD FORMAT

FIG. 1 diagrammatically illustrates one track of a multitrack block of data recorded in accordance with the teachings of the present invention. It is understood that any suitable recording scheme may be utilized in this format. For purposes of discussion only, it is assumed that phase-encoded recording, described in U.S. Pat. No. 3,217,183, is used with synchronization bursts of 1's with padding bursts of 0's. The forward direction of tape movement is assumed to be from right to left. Therefore, the beginning of the block of data is at the left-hand edge of FIG. 1.

The recorded block of data signals in each track includes preamble 10 consisting of a synchronizing burst of signals B. The block is concluded by a similar set of synchronizing signals B in postamble 24. Intermediate the preamble and postamble are interleaved sets of data signals D, marking signals M, and resynchronization signals B. Data signals are grouped in sets 12, 16, and 22. The interleaved resynchronization signals B are grouped in resynchronization sets 14 and 20. These latter signals enable resynchronization of a dead track within a block of data signals. It is understood that the number of sets of data signals and the interleaved resynchronization signals is a matter of design choice. Identifying the boundaries between the preamble, postamble, data signals, and the interleaved resynchronization signals are a plurality of marker signals 11, 13, 15, 17, 21, and 23. The recording of the illustrated block of signals begins from the left and proceeds toward the right in accordance with known techniques. The burst of signals are simultaneously recorded in all tracks. Defining one byte as being one cell in each track across a magnetic tape, a burst signal is all 1's in a byte. Marker signals are similarly constructed of all 1's and all 0's in a plurality of bytes. The ensuing discussion for the most part is directed at a single track in a multitrack record.

It is desired, as will become apparent, that the number of bits recorded on the tape or other media between the beginnings of successively occurring sets of data signals be the same or have the same remainder when divided by the number of ROC states. It is preferred all such spacings be identical except the last spacing in a block which may be truncated. That is, the number of bits between the trailing edge of marker signals 11, 15, and 21 should be identical or have the same remainder when divided by the number of ROC states. This spacing is represented by double-ended arrows 26. The length of the set of data signals 22 is not important insofar as reading from left to right is concerned. However, in systems where reading occurs in both directions of tape motion, the length of data set 22 is important for maintaining the relationship between postamble 24 and marker signal 17 the same as the relationship between marker signals 13 and 17. As will become apparent, such consistency in spacing reduces costs in read circuits. At the end of a data block, it is quite difficult, if not impossible, to always ensure that the number of data signals 22a within set 22 will fill all the predetermined number of digit positions (for example, 1,024). To make the remainder when data set 22 is divided by the number of ROC states the same as the other data sets 12 and 16, a subset 22b of padding signals P are added. Such signals P are either a string of 0's or a string of 1's in accordance with the definition of the recording system. For convenience, marker signal 23 is disposed between subset 22a of data signals and padding signals in subset 22b.

The illustrated format of tape recording enables resynchronization of a dead track as well as the requeuing of a reactivated track in a multitrack system within the block of data signals. Later, a more detailed format and circuit timing relation is defined in Table I. It is not necessary to continue dead-tracking throughout the block of data signals, thereby permitting a longer block of signals to be reliably recorded and reproduced than heretofore was generally practiced.

Preamble 10, postamble 24, and synchronizing signals B are strings of 1's. Similarly, the interleaved resynchronization signals B are string of 1's. For simplicity, all bursts of signals B should have the same length and characteristics. The end of preamble 10 is indicated by marker signal 11. All marker signals used in the first-described embodiment have two bytes respectively having all 0's and 1's recorded therein at the beginning of a set of data signals and all 1's and 0's recorded therein at the end of a set of data signals. Therefore, the beginning of the block of data consists of a string of 1's in preamble 10 and a 0 and a 1 in marker signal 11.

Data signals D are any mix of 1's and 0's or may be permutation codes. Each set of data signals may be of any predetermined length. In one constructed embodiment of the present invention, each set of data signals was arbitrarily selected as containing a maximum of 1,024 cells or digit positions per track, or 1,024 bytes of data in a multitrack record. The last set of data signals 22b may contain fewer than 1,024 as will become apparent.

Reproducing the recorded data signals D, shown in FIG. 1, may be accomplished by reading in either direction. In reading from left to right, preamble 10 is first read to synchronize the self-clocking read-back circuits. Upon detection of marker signal 11, the read-back circuit establishes a predetermined count (1,024) for counting data signals from set 12. Data signals 12 are then read. Upon detection of marker signal 13 and the completion of the predetermined count, the read-back circuit discontinues sending data signals and prepares to read set 14 of resynchronization signals B.

Such a read operation (reading a set of data signals and a set of resynchronization signals) is repeated until either the detection of postamble 24 or receipt of a stop read signal from control circuitry (not shown). If the illustrated track had been deadtracked (i.e., the signal envelope of the read-back signal fell below an amplitude threshold or a phase error was detected), the read-back circuitry normally would automatically ignore any signals received from such track. By use of error correction codes, the dead-tracking can be compensated for in some instances in a control unit, which is not the subject of the present invention. However, in reading back the format illustrated in FIG. 1, the sets of resynchronizing signals are utilized to resynchronize the channel clock within the block of signals. If resynchronization is successful, the next-occurring set of data signals is read. Therefore, the dead-tracking function can be aborted within the block of data by an interleaved set of resynchronizing signals B. Upon detection of a marker signal, the read-back circuit is activated to read the next-occurring set of data signals.

Also, in magnetic tape recording, it is desirable to have expansion space in a block of data. Padding signals 22b can provide such expansion without subsequently altering the length of a data block. It is also understood that such padding signals may be inserted in any of the sets of recorded data signals for permitting growth of the record anywhere within the data block.

In the FIG. 1 illustration, marker signal 23 being all 1's across the tape followed by all 0's across the tape, is effectively extended by the padding 0 signals. The last padding 0 abuts the first 1 signal in postamble 24. There is no need for a marker signal at this point because the 0–1 change signifies the beginning of postamble 24.

Reading in the reverse direction is substantially identical to the forward direction. Marker signals 23, 17, and 13, respectively, signify the ends of sets of recorded data signals. A difference arises in that for deskewing, the later-described read-in counters (RIC) for the various record tracks are initiated at the 1–0 change between postamble 24 and padding signals P. This establishes a fixed relationship between the state of the ROC and marker signal 21. Such action is more fully described later. If the counters are always in the same signal state upon the reading of such marker signals, the first-occurring data signal (i.e., the first cell being scanned) may always be loaded into the same relative position in the deskewing apparatus. This simplifies deskewing and the control functions related thereto. It also facilitates requeuing a dead track in accordance with teachings of the present invention. The reasons for such simplification need not be delved into for purposes of understanding the present invention.

GENERAL DESCRIPTION

Figure 2:
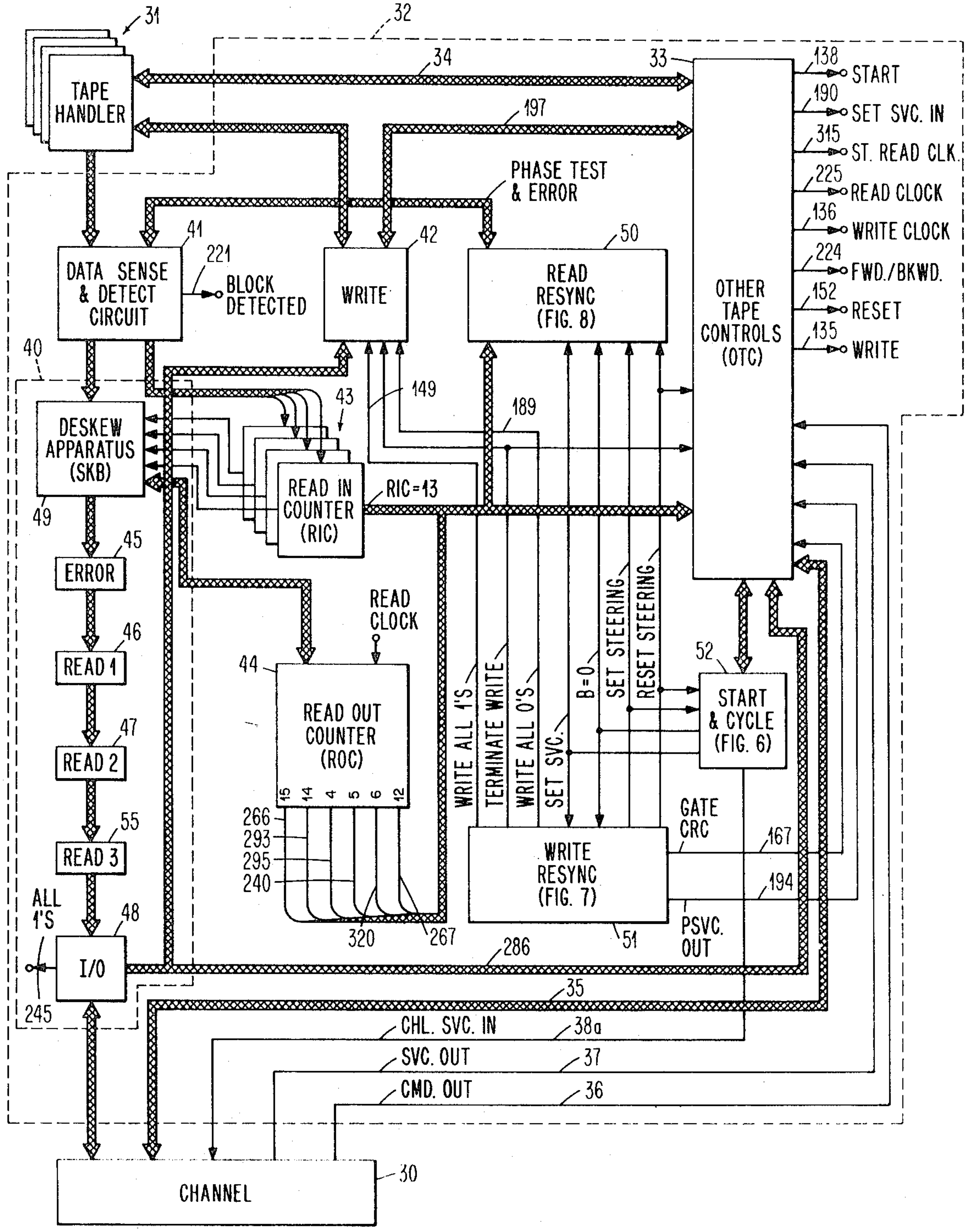
FIG. 2 is a simplified block signal flow diagram of a magnetic tape system utilizing the teachings of the present invention.

FIG. 2, is a simplified illustration of a magnetic-tape subsystem using the teachings of the present invention and connected through communications channel 30 to utilization means, such as a central processing unit (not shown). The subsystem, as usual, has a plurality of tape handlers 31; only one of which is activated for reading or writing at a given time. Tape control system 32 selectively couples one of the tape handlers 31 to channel 30 such that data can be recorded on or read from a magnetic tape (not shown) being processed. The invention is illustrated by certain portions of such tape control; those certain portions being accented. It is understood that many other control circuits are necessary to the successful operation of a magnetic-tape subsystem; such other control circuits are diagrammatically illustrated by box 33 labeled OTHER TAPE CONTROLS (OTC). Such OTHER TAPE CONTROLS (OTC 33) include motion controls, ON and OFF controls for the respective tape handlers, and the like. Signals for effecting such other control functions are exchanged between OTC 33, channel 30, and tape units 31 over cables 34 and 35.

Some control signals intimately associated with the practice of the present invention are now described. First, two control signals supplied from channel 30 are described. A COMMAND OUT (CMD OUT) signal is supplied over line 36 from channel 30 to tape control 32. CMD OUT initially sets up OTC 33 in a read or write operation. Signals termed "command" are sent to OTC 33 along with CMD OUT for conditioning OTC 33 to perform certain functions. CMD OUT sent during performance of a given function indicates to tape control 32 that no more tape functions are desired. In a read operation, such a CMD OUT is interpreted as "do not send any more data to channel 30 from the activated tape handler 31." In a record or write operation, such a CMD OUT indicates there is no more data to be recorded. The latter two instances of CMD OUT are the only ones referred to herein.

A SERVICE OUT (SVC OUT) signal, supplied over line 37 to OTC 33 during a read operation, indicates that channel 30 has successfully received one byte of data supplied from a tape handler 31. During a write operation, SVC OUT is interpreted as indicating that data to be recorded is not available from channel 30.

Control signals are also supplied from tape control 32 to channel 30. Many of these are indicated by cable 35. A control signal of interest to the practice of the present invention is the CHANNEL SERVICE IN (CHL SVC IN) signal supplied over line 38*a*. This latter signal is initiated by OTC 33 and supplied through start-and-cycle circuit 52 for reasons that will become apparent. In a read operation, CHL SVC IN signal indicates that one byte of data has been read from a tape in tape handler 31 and is available to channel 30. During a write operation, CHL SVC IN is a request for channel 30 to supply the next byte of data to be recorded. Upon supplying same, channel 30 supplies a SVC OUT control signal indicating that such byte of data is available or CMD OUT for stopping the write operation.

These just-described signals are shown as being received through OTC 33. While those control circuits are not described in detail, the ensuing detailed description of tape control 32 and known tape control circuits will make the means effecting such exchange apparent.

Data flow between an activated tape handler 31 and channel 30 is via the buffer registers 40. Buffer registers 40 include deskewing apparatus 49, as later described. In a read operation, data sense-and-detect circuits 41 (one circuit for each record track) receive signals from one of the respective tape handlers 31 and supply digital data signals to buffer registers 40. Such signals, while not yet deskewed, are in digital form. Data sense-and-detect circuits 41 include self-clocking circuitry necessary for the successful readback of high density magnetic records. Also includes are amplitude and phase threshold circuits for detecting whether or not recorded data signals are being successfully recovered from the tape being processed. Such circuits are well known and will not be further described for that reason.

Data flow during a write operation is from channel 30, through the buffer registers 40, thence to write circuits 42 (one circuit for each record track). Write circuits 42 convert the received digital signals into the appropriate recording waveforms in accordance with the selected recording scheme and supply same to the activated tape handler 31 for recording on tape. Write circuits 42 may include a set of final amplifiers with the actual recording signals being distributed directly to the recording transducers of any tape handler 31 over a write bus.

Data signals to be written on a tape in a handler 31 are supplied to I/O register 48 in buffer registers 40. Suitable gating control circuits (not shown) gate the signals directly to write circuits 42 for a recordation on a magnetic tape. The one exception to this statement is described in detail later. All of the other registers shown within buffer registers 40 are used in the read-back operation. The digital signals being processed during a read operation are first supplied to deskewing apparatus 49. Such deskewing apparatus is well known in the art. For example, a deskewing system using a read-in counter (RIC) 43 for each track and a single readout counter (ROC) 44 is described by Floros in U.S. Pat. No. 2,921,296. RIC's 43 keep track of the digital signals as they are received from data sense-and-detect circuit 41. When all RIC's 43 have proceeded from a predetermined signal condition, one byte of data has been aligned and is ready to be transmitted to channel 30. At this time, ROC 44 is altered by one count and, simultaneously therewith, one byte of data is transferred to error register 45. In error register 45, error detection and correction functions are performed. Such functions are not a part of the present invention and, therefore, will not be further described. From error register 45, the byte of data is transferred to read 1 register 46, thence to read 2 register 47 and read 3 register 55. The number of these registers is a design choice made with respect to timing. From read 3 register 55, the byte of data is supplied to I/O register 48. If the read-back circuitry of FIG. 2 is currently reading back data signals D, a CHL SVC IN signal is supplied to channel 30 to indicate that I/O register 48 has one byte of data available for transfer to channel 30. When reading resynchronization signals B, the CHL SVC IN signal is never sent to channel 30, hence resynchronization signals are obliterated as new signals are received.

The description of FIG. 2 up to now has concerned itself with prior tape control devices. The additional circuits used to implement the present invention in the FIG. 2 illustrated control include read resync circuits 50, write resync circuits 51, and an illustrative modification of the sequence control of OTC 33 is set forth in start-and-cycle circuits 52. It is to be understood that some of the individual functions performed and circuits illustrated in these latter three circuit configurations may have been found in prior tape control units. However, the functions performed by these three circuits and the interconnections therebetween and with the other portions of the tape subsystem as set forth in the later-described flow charts illustrate how the invention can be practiced. An understanding of the detailed connections illustrated in FIG. 2 will become apparent from the descriptions of the three circuits. Generally, OTC 33 and start-and-cycle circuits 52 initialize the control unit and respond to the recorded signals for detecting the resynchronization bursts, for inhibiting transfer of such resynchronization signals to channel 30, and respond to a CMD OUT signal for stopping operations. Read resync circuits 50 control resynchronization of a dead track and requeue such dead track into the deskewing operation performed by deskew apparatus 49. In this connection, read resync circuits 50 have a close interaction with the deskewing operation and data sense-and-detect circuits 41. Write resync circuits 51 program the operation of the tape system such that resynchronization signals are properly written between sets of data signals being recorded.

FORMAT-TO-SYSTEMS RELATIONSHIPS

Before proceeding into the description, the format relationship of data signals on the most lagging track on the tape with the readout counter (ROC), the burst counter, and the byte count is described with respect to Table I. The RIC of the most lagging track determines the ROC count; therefore the one most lagging track only is considered. In the Table, "D" indicates data signals and may be either a zero or a one, "C" indicates a check digit, "M" indicates a marker signal which may be either all zeros or ones in accordance with the previous discussion. The relationship of 0's and 1's for the illustrated embodiment is shown in parenthesis under the MM designations. Numbers are counts in the respective counters.

TABLE I

| | Signals | | | | | | | | | | | | |
|---|---|---|---|---|---|---|---|---|---|---|---|---|---|
| | D | C | M(1) | M(0) | 1 . . . 1 | 1 | 1 | 1 | 1 . . . 1 | M(0) | M(1) | D | D |
| Burst counter | | 1 | 2 | 3 | 4 . . 15 | 16 | 17 | 18 | 19 . . 31 | 32 | 33 | 34 | |
| ROC forward | 14 | 15 | 0 | 1 | 2 . . 13 | 14 | 15 | 0 | 1 . . 13 | 14 | 15 | 0 | 1 |
| ROC backward | 0 | 15 | 14 | 13 | 12 . . 1 | 0 | 15 | 14 | 13 . . 1 | 0 | 15 | 14 | 13 |
| Byte count | 0 | 0 | 0 | 0 | 0 . . 0 | 0 | 0 | 0 | 0 . . 0 | 0 | 0 | 1,024 | 1,023 |

The write and read-back systems are designed such that ROC will pass a reference count at predetermined points of the recording within the data block. It is to be appreciated that ROC changes from 15 to 0 several times while reading data. However, upon the onset of a set of data signals, ROC should be moving from 15 to 0 in either direction of reading. As shown above in the forward direction which corresponds to reading Table I from left to right, ROC changes from 15 to 0 upon detection of the marker signal at the trailing end of the all 1's resync burst. The resync burst contains 28 ones such that the marker signals plus the resync burst corresponds to two rotations of ROC. At the right-hand edge of Table I, it is seen that ROC in the forward direction changes from 15 to 0 when reading the trailing end marker signal, as desired. In the backward direction, the marker signal ROC count relationship is somewhat different because of the check digit in the data subset. Leaving the resync burst, which is now the left-hand side of Table I, ROC=15 at the check digit and goes to 0 for the first-encountered data byte.

Figure 7:
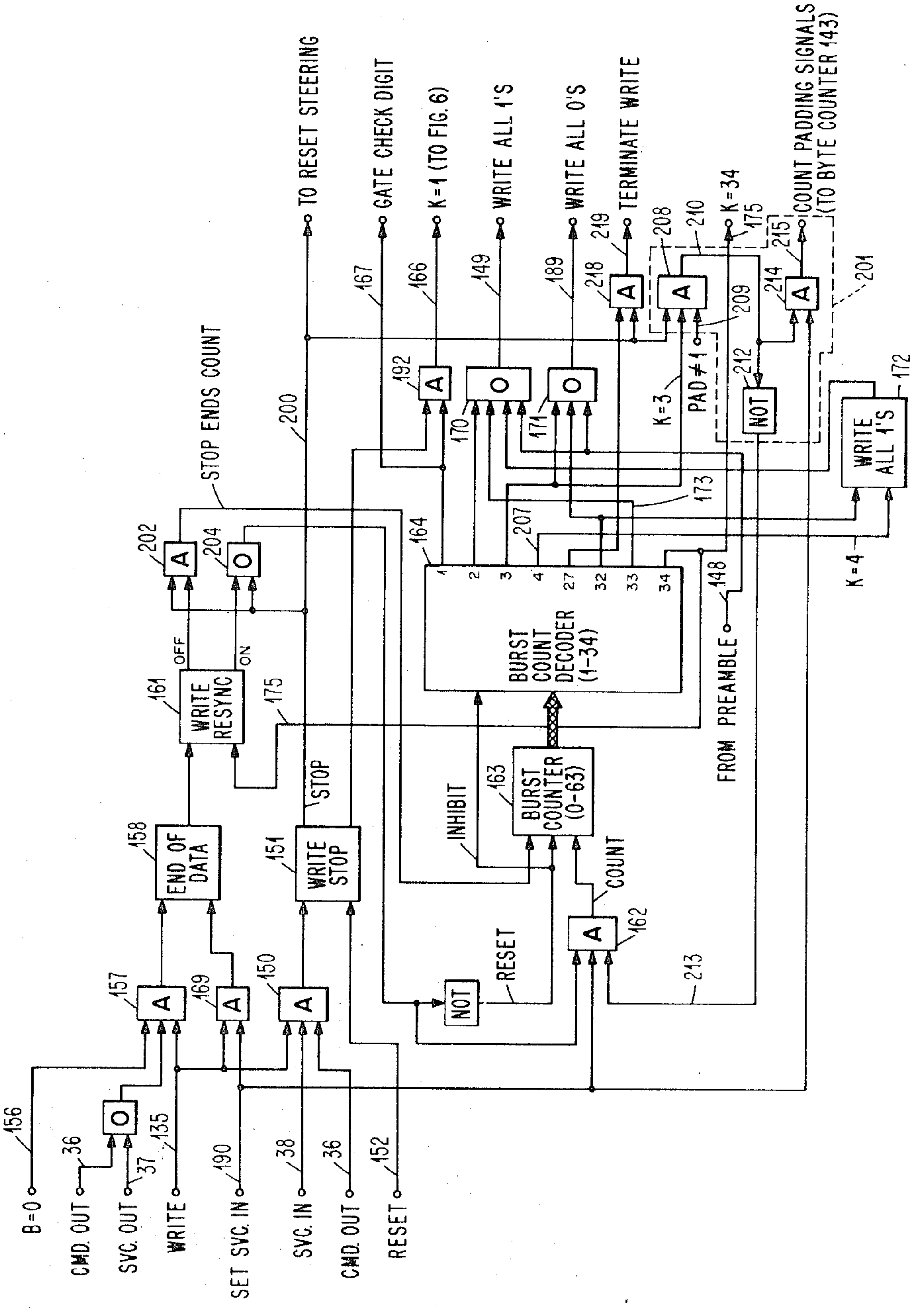
FIG. 7 is a simplified signal flow diagram of a write resynchronization circuit usable with the FIG. 2 illustrated apparatus.

The burst counter, used during write operations, to record or write a resync burst is shown in FIG. 7. When the burst count is equal to 1, a check digit (CRC) is transferred for recording; when equal to 2 and 3, the marker signal is written (i.e., all 1's then all 0's). In steps 4 through 31, 28 "all 1 bytes" are written. In burst count steps 32 and 33, the marker signal consisting of all 0's then all 1's is written. In step 34, writing of data is reinitiated. The byte count is shown as a decrementing count. The last data byte is B=0, which corresponds to ROC in the forward direction of equal 14. At the right-hand edge of Table I, the byte counter is shown as being set to 1,024 at the first data byte and decremented to 1,023 at the second data byte.

In observing Table I, it should be remembered that the data byte aligned with ROC forward = 14 does not reach I/O register 48 until several cycles of ROC. That is, ROC 44 counts the data bytes as they are transferred from SKB 49 to read 1 register 46. That data byte will not reach the I/O register until ROC=3. Check digit does not reach I/O register 48 until ROC forward = 4. Therefore the SVC IN signal to channel 30 is not forwarded from control unit 32 until after ROC 44 has reached a count of at least 5. Then SVC OUT is received from channel 30. This is an important point to remember in considering the timing of the resync bursts and the read resync cycle illustrated hardware embodiment.

RECORDING

Figure 3A:
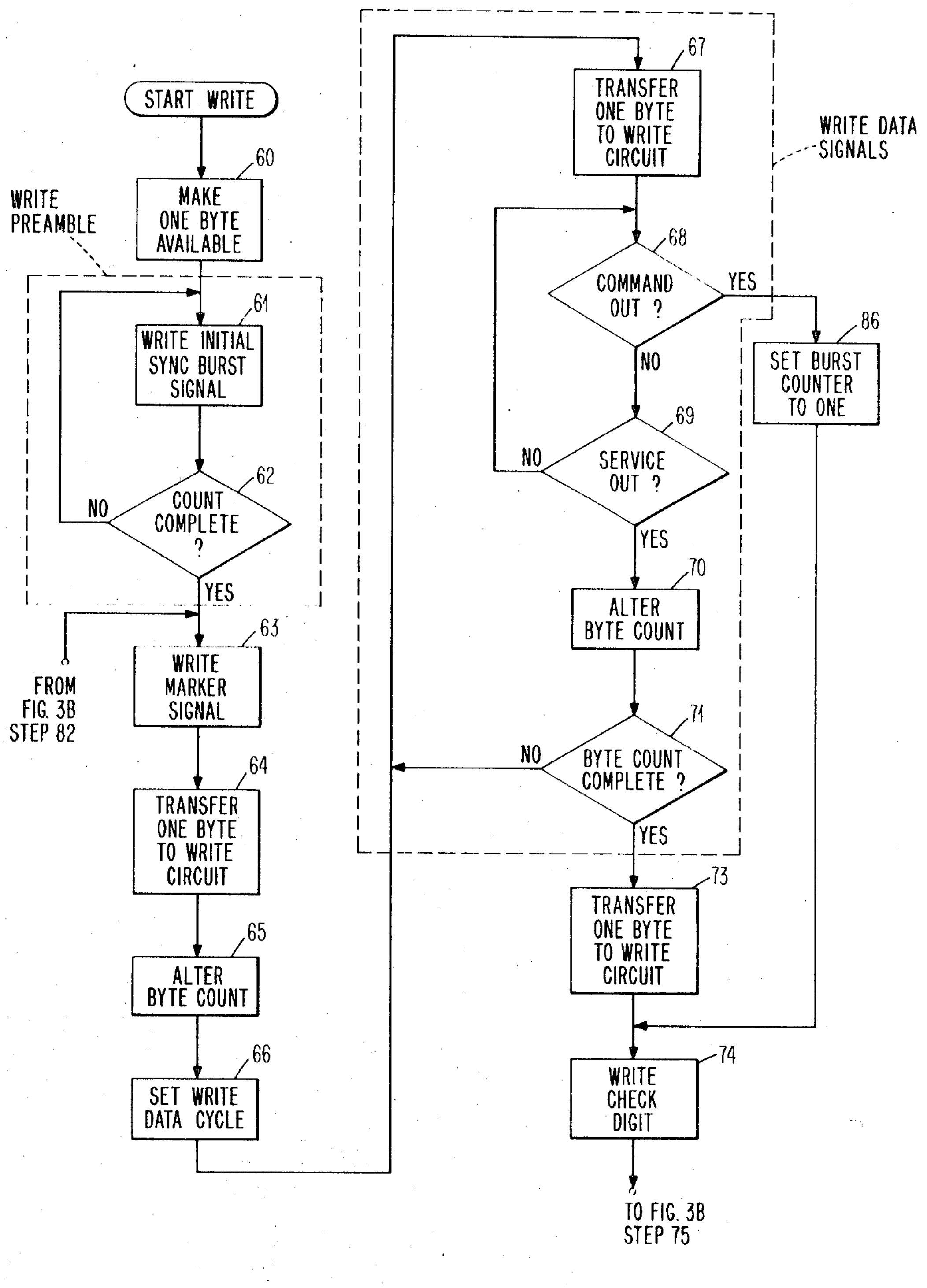
FIGS. 3A and 3B show a simplified program/hardware operation flow chart used to record a block of data in accordance with the teachings of the present invention and is used to describe the recording operation of the FIG. 2 illustrated apparatus. These figures are referred to generally as FIG. 3.

Recording signals on a magnetic tape using the present invention are first described. Generally, there are two approaches to recording in accordance with the present invention. The first approach is to write a number of data signals D within a block of data signals without knowing beforehand the total number of data signals to be recorded. This first approach is described in detail with respect to FIGS. 3 and 7. The second approach is to write a predetermined number of data signals to form a block of such data signals having interleaved resynchronization signals. The second approach is described generally later as a modification to the first approach. Because all recordings can be effected without knowing beforehand the number of signals to be recorded, the first-mentioned approach is described in detail. For purposes of discussion, in both approaches, it is assumed that one byte of data is recorded across the tape at a time. The byte of data may consist of eight binary digit positions plus parity. The parallel recording of such a byte requires one cell in each of nine data tracks.

Figure 3B:
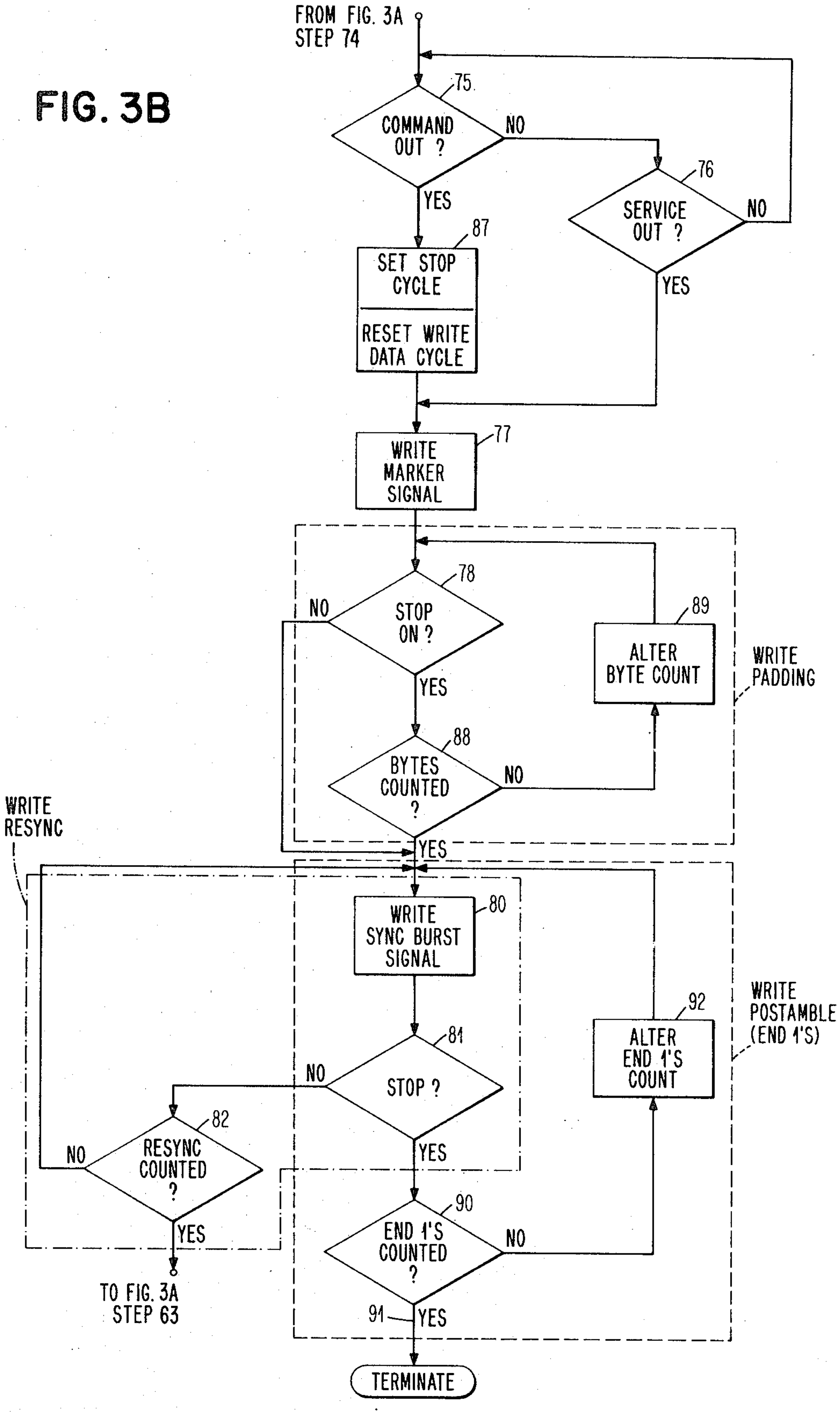

To record an unknown number of data signals and ensure there is data available to be recorded, it is desirable for the tape system to first obtain one byte of data to be recorded from channel 30 before the tape motion in a handler 31 is initiated. Therefore, in preparing for recording, control 32 requests the first byte of data before initiating motion of the tape. Referring to FIG. 3, the first step 60 in the program/hardware sequence flow chart is to make available one byte of data to be written. As soon as one byte of data is available, a motion control signal is issued by OTC 33 over cable 34. When the tape has reached operating velocity, an indicating signal is supplied over cable 34 to OTC 33. Preamble 10 is then written by repeating steps 61 and 62. In step 61, "-write initial sync burst" signal (one signal B in a burst of such signals B) is written in each track on the tape. In step 62, the number of signals B actually written in each track is compared with the number desired to be written in preamble 10. If the count is not complete, operation is returned to the input of step 61. When preamble 10 count is complete, operation proceeds to step 63 to write one marker signal.

The marker signal in the illustrated embodiment embodiment consists of writing all 0's across the tape, followed by writing all 1's across the tape. Any form of marker signal, of course, can be used. Next, in step 64, the byte of data made available in step 60 is transferred to write circuits 42. According to step 65, as the byte is transferred, a later-described byte counter in start-and-cycle circuits 52 is activated to tally the number of recorded bytes. This tally is used to determine the size of sets of data signals.

Then, in step 66, the write data cycle in start-and-cycle circuits 52 is initiated. At this time, the CHL SVC IN signal is forwarded to channel 30 enabling another byte of data to be transferred to I/O register 48. In this discussion, it is assumed that the transfer rate of channel 30 is much higher than the recording rate in tape handler 31. Therefore, the data signals to be recorded are available in I/O register 48 substantially simultaneously with the transmittal of the CHL SVC IN signal.

The writing of one set of data signals is completed by the next loop of steps 67 through 71, inclusive. If 1,024 digit positions occur in each track, then 1,023 bytes of data are recorded by such loop cycling itself 1,023 times. Remember, one byte has already been recorded. In step 67, one byte is transferred from I/O register 48 to write circuit 42 for recording. In decision step 68, the receipt or nonreceipt of a CMD OUT signal is sensed. If the CMD OUT signal has been received, further writing is stopped and a write termination operation, later described, is initiated. If no CMD OUT signal has been received, the write operation proceeds to decision step 69. In step 69, a test for receipt of the SVC OUT signal is made. If it has not been received, no data is available from channel 30. Steps 68 and 69 are repeated until SVC OUT is received. Normally, the wait for a SVC OUT signal is short. As soon as SVC OUT is received, in step 70 the byte counter in start-and-cycle circuit 52 is altered by unity. Then, in decision step 71, the byte counter is sensed to see whether or not the byte count is complete (i.e., whether or not 1,024 bytes have been recorded). If the count is not complete, the sequence is repeated. If it is completed, then during step 73 the last byte of data is transferred to write circuit 42. This means that, in decision step 71, a byte count of 1,022 is tested with the last byte being written during step 73, making a total of 1,024 bytes. In many recording systems, it is desired that a longitudinal (track) or cyclic redundancy check digit (CRC) be recorded. This recording occurs during step 74. This check digit may be one byte across the tape between the last data signal and the marker signal 13, for example.

The write operation in steps 75–82 then writes marker signal 13 and set 14 of resynchronization signals B. Before initiating the writing of the first resynchronization signal, in step 75 the receipt of CMD OUT is again tested. If CMD OUT has been received, a write termination operation is initiated. If a CMD OUT signal has not been received, then the receipt of a SVC OUT signal is sensed during step 76. It is remembered that before data is initiated to be written, it is desired to have one byte of data in register 48. This is the purpose of testing for the receipt of a SVC OUT and not initiating further operation until SVC OUT has been received. As soon as SVC OUT has been received, during step 77 a marker signal, such as marker signal 13 (all 1's then all 0's), is written. Immediately after writing the marker signal, STOP is sensed during step 78. If STOP is on, then postamble 24 is written, as will be later described. If STOP is off, resync burst 14 is written in steps 80 through 82. In step 80, one signal B is written in one cell position of each track. Then, during step 81, STOP is again sensed. If STOP is off, which would be the case in writing a resync burst, in step 82 the tally of the recorded signals B is sensed. If it is desired to write 24 signals in a burst, then the loop 80, 81, and 82 is repeated until the tally has reached 24. At that time write operations return to step 63 (FIG. 3A), which writes marker signal 15. Then, the above-described cycle for writing a set of data signals is repeated. The above-described operations of alternately writing data signals and burst of resynchronization signals are repeated until CMD OUT is received, at which time the writing operation is terminated. Termination includes recording padding signals P in data set 22 and writing postamble 24.

Because of the nonpredetermined length of data to be recorded, a CMD OUT signal for terminating the write operations can be received at any time. For this reason, CMD OUT is sensed in steps 68 and 75. In step 68, the CMD OUT is sensed while writing a set of data signals. If a CMD OUT has been received, the write operation is terminated. First, a check digit must be written. To set up the appropriate sequences, in step 86 a later-described resync burst counter is set to 1. This action enables a sequence to write a check digit in step 74. Since CMD OUT has already been set, the operation branches to step 87 which sets a stop latch in start-and-cycle circuit 52. This action indicates that STOP is on. Marker signal 23 (all 1's, then all 0's) is written during step 77. In step 78, since STOP is on, decision step 88 determines whether or not the byte count has been complete (i.e., whether the correct number of positions have been used to complete data set 22). Such correct number is any number which is an integral multiple of the ROC modulus. In the present illustration, such correct number is an integral multiple of 16, the number of ROC 44 stable states. If the byte count does not bear the correct relationship to the number of ROC states, the byte count is altered by unity in step 89 and then step 78 is repeated. This small sequence loop is repeated to complete the byte count. This action writes all 0 padding bytes.

The operation proceeds to step 80 in which one postamble signal B is written. Since padding signals are 0's and burst signals B are 1's, the end of the block is indicated by the 0 to 1 transition. With no 0 padding signals, the all 0's byte of marker signal 23 is the last all 0 signal in the data block. Then, in decision step 81, STOP being on, the operation goes to END 1's (postamble) count decision step 90. The postamble count is preset in step 86 such that a set number of bursts of signals B are written in repeated steps 80. The number of postamble all 1's bytes may be designed into the later-described hardware or be programmed. The postamble count is altered (incremented) in step 92 in each repetition. Upon the completion of the postamble count, the flow chart is exited at line 91 to terminate the write operation in a known manner.

READING

The sequence of operations for reading recorded data in the format shown in FIG. 1 is now described. It is assumed that the tape is moving and the read circuits have been initialized; that is, the read circuits are all activated to the proper condition and awaiting the detection of a block of data. Upon the detection of read-back signal envelopes by data sense-and-detect circuits 41, the read operation is initiated in step 100 of FIG. 4. Step 100 is not completed until preamble 10 or postamble 24 has been read. This completion is detected by sensing an all 0's byte in marker signal 11 after reading the burst of all 1's bytes. The first decision is performed in step 101, wherein the direction of read is determined. If the read is in a forward direction, padding signals **22*b* need not be eliminated from the read-back; therefore, the read operation goes immediately to decision step 102 which detects when ROC 44 has a state equal to 5. This state corresponds to the first byte of readback data having progressed through buffer registers 40 into I/O register 48. The number 5 is derived from timing considerations. Other hardware designs would alter the state of ROC 44 at which the read sequence is initiated. In any event, when the ROC 44 has reached a predetermined state, a read sequence is initiated, indicated by line 103**.

However, if the reading operation is in the backward direction, decision step 104 is first performed. This step detects marker signal 23. If no marker signal has been detected, padding signals **22*b* are being read. During this cycling, the byte count is altered in step 109 and there is no transfer of signals to channel 30. The read-back padding signals are transferred into read-1 and read-2 registers 46 and 47 for the detection of marker signal 23. After the detection of marker signal 23 in step 105, a check digit is transferred to error detection circuitry (not shown). It will be remembered that the last item written in any set of data is a check digit. Therefore, when reading in the backward direction, the first data to be encountered is this check digit. Step 106 is a two-cycle delay such that the first byte of data signals D, following the marker signal in registers 46 and 47, is transferred into I/O register 48. Upon the completion of delay in step 106, the read sequence is initiated, indicated by line 103**.

Detection of marker signal 23 may also be accomplished within data sense-and-detect circuits 41. This approach is followed in the later-described hardware embodiment. Generally during a backward read operation, detection of a first occurring "1" signal after detection of a "0" signal indicates marker signal 23. The leading track then establishes detection of marker signal 23.

The first step 107 in read operation sets a "steering latch" in start-and-cycle circuit 52. This latch being set signifies the beginning of a read operation and enables circuit 52 to cycle until one set of data signals is read. In step 108, one byte of data is read. This means that one byte of data is transferred from deskewing apparatus 49 to the error detection and correction register 45 under the control of ROC 44. During the same step, the byte counter in start-and-cycle circuit 52 is altered by unity. When reading set 22 of data signals, the byte count includes padding signals P.

Figure 5:
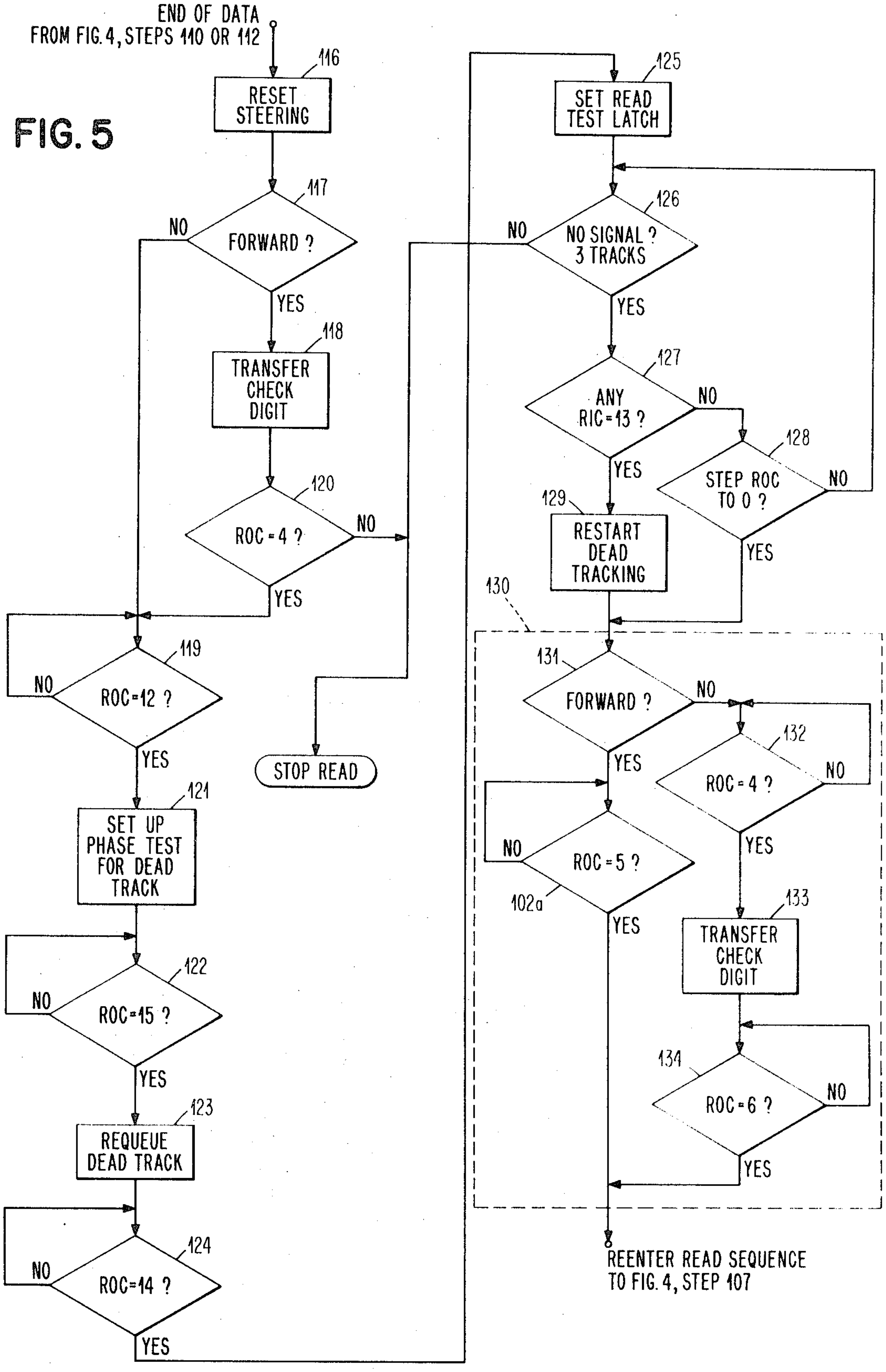
FIG. 5 is a simplified program/hardware operation flow chart showing detailed read-back resynchronization operations usable with the operation set forth in the flow chart of FIG. 4.

During decision step 110, the status of the byte counter is sensed. If the byte count is complete, end of a data set is indicated; reading data is terminated, and a read resync cycle 111 is initiated. Read resync cycle 111 is described later with respect to FIG. 5. This cycle enables the automatic resyncing of a dead track and inhibits the transfer of resynchronization signals B through I/O register 48. It is also used to terminate a read operation. If the byte count is not complete, decision step 112 is initiated. If a marker signal is detected, end of data is indicated and the read resync cycle of FIG. 5 is initiated. Only if no marker signal has been detected and the byte count is not complete is step 103 reinitiated and repeated until one of the two end of data conditions is met.

The initiation of the read resync cycle of FIG. 5 includes resetting steering circuit in step 116. The direction of tape motion is again detected in decision step 117. If tape motion is in the forward direction (i.e., from left to right in FIG. 1), a check digit (CRC) is transferred to an error detection and correction circuit in step 118. If the reading is in the backward direction, the check digit has already been transferred, and the operation proceeds directly to decision step 119. This decision step determines the state of ROC 44. Before a resynchronization burst can be read, all data must have been transferred from I/O register 48 to channel 30. In the illustrated hardware design, the last data byte resides in I/O register 48 when ROC=12. Returning now to the forward direction reading, after the transfer of the check digit, the condition of ROC 44 is checked in decision step 120. In the particular embodiment, when ROC=4, everything is appropriate for entering step 119. If, however, ROC 44 contains any number but 4, the read operation is stopped. In the illustrated embodiment, the check digit should be transferred when ROC 44=4. If operation is different, either the data set being read is the last data set in the block and contains less than 1,024 bytes, or a faulty read operation has occurred and should be stopped. Control circuits in OTC 33 determine which is the case by measuring the length of the remaining data signals and setting an error latch (not shown) if the termination was premature.

Upon detection of ROC 44=12, the read resync operation is initiated by setting a phase or resynchronization test for dead track in step 121. This setup enables testing whether or not the dead track has been resynchronized at that point in the resynchronization burst. In decision step 122, deskewing apparatus 49 has been stepped to reference state ROC=15. In the illustrated deskewing apparatus, there are 16 deskewing positions corresponding to ROC=0 through ROC=15. Change from ROC=15 to ROC=0 is arbitrarily defined as a reference change. For requeuing a dead track into deskewing apparatus (SKB) 49, the apparatus should be in a well defined operational state. Control 32 is cycled until this condition occurs. In step 123, the requeuing of the dead track into deskewing apparatus 49 is set up. This action activates circuitry or programming for detecting the successful readout of a present dead track into deskewing apparatus 49. In step 124, ROC 44 is cycled until it reaches state 14. This signal state corresponds to a predetermined number of resync bytes of all 1's being transferred through deskewing apparatus 49. During this delay, the dead track is hopefully resynchronized and made ready to be reactivated. The number of resync signals processed corresponds to the length (16 bytes) of deskewing apparatus 49.

The next step in the flow chart is to test the success of the resynchronization of the dead track. In step 125, a test circuit is activated. In decision steps 126 through 128, the test is repeated throughout the resync burst being read. In step 126, a test is made of whether or not at least three tracks are not supplying satisfactory signals, the reading operation is aborted. Such a condition indicates either end of a data block or read-back is entirely unsatisfactory. If, however, less than three tracks are supplying no signals, decision step 127 is initiated. The test is whether any RIC 43 has a value of 13. This magnitude corresponds to the detection of the maximum skew in the illustrated read-back system. If none of the RIC's have a value of 13 in decision step 128, there is a test made of whether or not an ROC step to 0 has been initiated. If no ROC step to 0 has been initiated, steps 126, 127, and 128 are repeated. ROC 44 stepping from 15 to 0 indicates successful readback from the previously dead track. That is, one byte of signals has been assembled into SKB 49. The occurrence of any RIC equaling 13 is an indication that the dead track has not provided signals to deskewing apparatus 49 (i.e., maximum skew has been exceeded). This relationship is described later with respect to Table I and FIGS. 9 and 10. Therefore in step 129, dead-tracking of such dead track is reinitiated. If an ROC step to 0 has been initiated in decision step 128, a successful resynchronization of the previously dead track has occurred. Of course, it must be remembered that, if there are no dead tracks, step 128 is performed immediately. This completes the read-back of a resynchronization burst.

Figure 4:
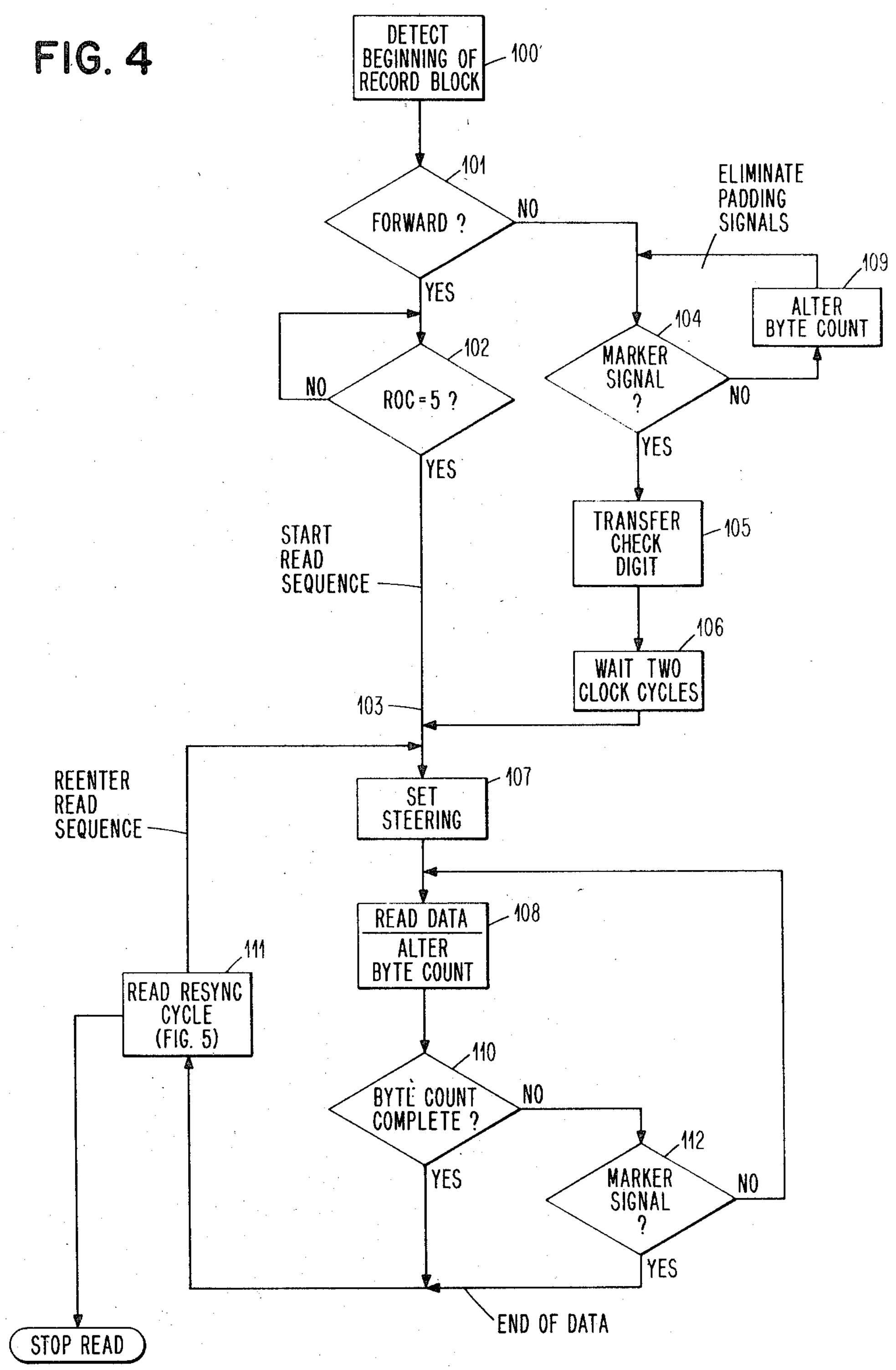
FIG. 4 is a simplified program/hardware operation flow chart of a read sequence used to read back and resynchronize a dead track in accordance with the teachings of the present invention.

Next, the read-back circuitry is conditioned by reenter read sequence 130 for reading the next set of data signals. In decision step 131, the direction of tape motion is again detected. If the motion is in the forward direction, decision step 102*a*, which corresponds to decision step 102 of FIG. 4, is performed. If it is in the backward direction, steps 132 through 134 are performed. In decision step 132, the condition of ROC 44 being equal to 4 is sensed. In step 133, a check digit is transferred to the correction circuitry in the same manner as in step 105 of FIG. 4. In decision step 134, there is a waiting period until ROC 44=6. Normally, it will be equal to 6 since the transfer of check digit in step 133 takes one cycle and advancing the first data byte to the I/O register will take one cycle. Upon completion of steps 102*a* or 134, the read sequence is reinitiated by performance of step 107 in FIG. 4. The above-described sequences are repeated until the detection of the end of the block of data. This may be accomplished in decision step 126 (FIG. 5) wherein more than three tracks do not supply a read-back signal.

The above-described flow charts of operations can be implemented by programming, hardware sequences, or a combination of both. A simplified illustration of a hardware implementation of the flow charts is described. The description of the hardware will be keyed to the flowcharting for a clearer understanding of the illustrated embodiments.

WRITE HARDWARE

Figure 6:
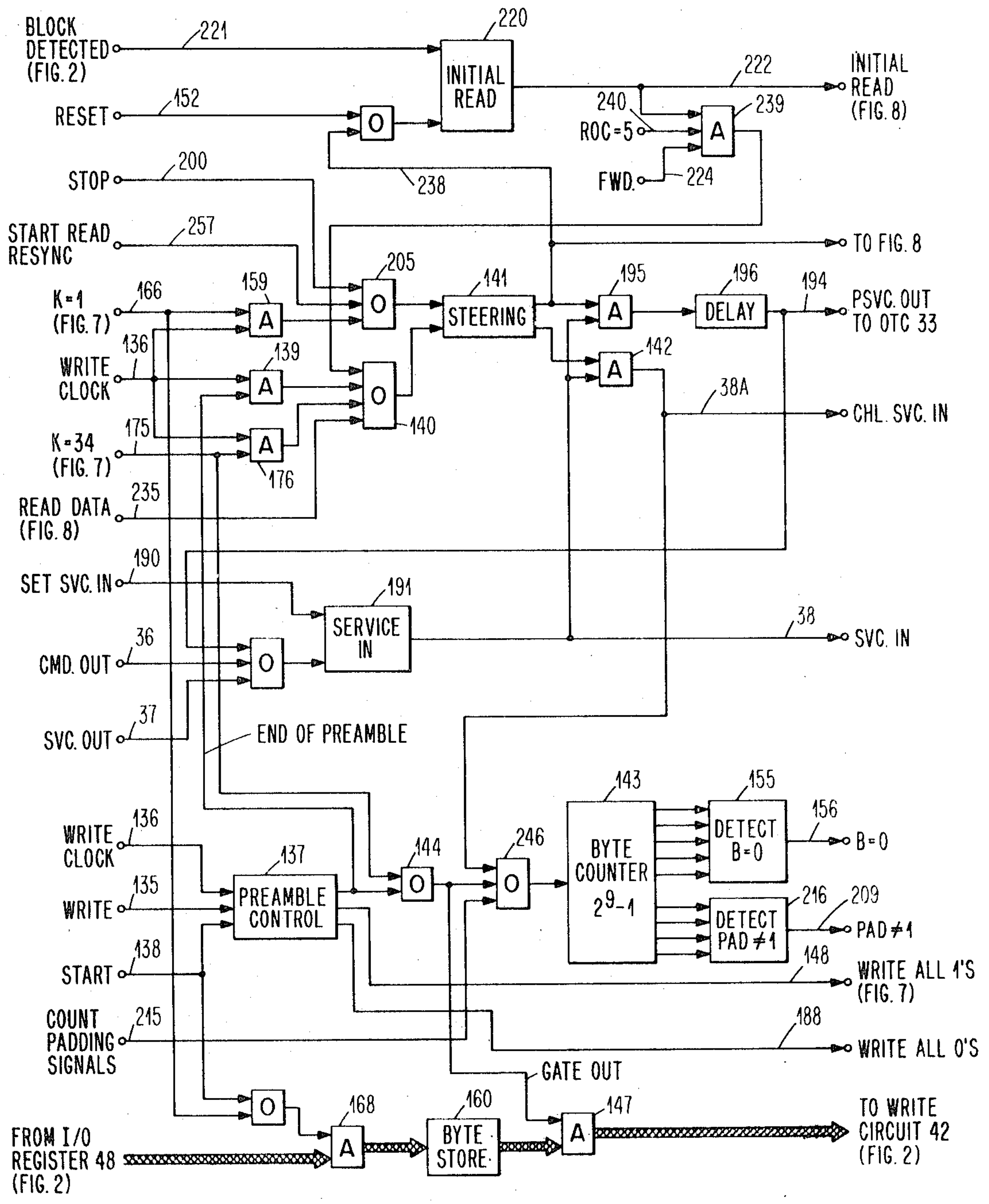
FIG. 6 is a simplified signal flow diagram of a start and cycle portion of the FIG. 2 illustrated apparatus.

Write operation hardware is described with particular reference to FIGS. 2, 6 and 7. The description assumes that the usual control signals have been transferred through channel 30 to OTC 33 for initiating a write operation. OTC 33 is supplying a continuous control signal on line 135 indicating a write operation is being performed as well as supplying a periodic write clock signal (pulse) on line 136. In a practical embodiment, the write clock pulse is delivered from a single source and within OTC 33 divided into a plurality of separately timed pulses. This approach is one of known design choice used to avoid pulse overlapping problems, other critical electrical signal-timing problems, as well as reducing the number of circuits in control unit 32. For purposes of understanding the present invention, it is unnecessary to delve into such engineering design niceties. Further, for simplicity, the actual connections are not shown but are understood to be made between the various figures. In FIG. 6, preamble control 137 is first activated by OTC 33 to write-preamble 10 of FIG. 1. This corresponds to performance of steps 61 and 62. Action is initiated by the write clock, the write signal, SVC OUT signal indicating that one byte of data is available, as in step 60, and start pulse on line 138. Preamble 10 is written as preamble control 137 supplies a write-all-1's signal over line 148 to write resync control 51. Control 51, in turn, supplies a write-all-1's signal over line 149 to write circuit 42. Upon completing writing the preamble, preamble control 137 writes marker signal 11, as set forth for step 63. It is recalled that this consists of writing an all 0's byte across the tape and then writing an all 1's byte. An all 0's signal is supplied over line 188 followed by a write-all-1's signal supplied over line 148 to write resync circuit 51. Circuit 51 transfers these signals over lines 149 and 189 to write circuit 42. Since recording preambles of all 1's or all 0's followed by a marker signal is well known, the details of preamble control 137 are not described. The later-described burst counter 163 of FIG. 7 could be used to write-preamble 10. This possibility will become apparent from the description of postamble 24 recording. Such sequencing is readily established by microprogramming.

Immediately after the marker signal of all 0's and all 1's having been recorded, the first byte of data to be recorded is sent to write circuits 42 for recording. Before tape motion is initiated, OTC 33 effected, transistor of the first byte of data from channel 30 to I/O register 48. Details of such transfer are known and not pertinent to an understanding of the present invention. One manner of obtaining and temporarily storing the first byte of data is the utilization of the start pulse on line 138 to transfer the byte of data to byte-storage register 160 (FIG. 6). This transfer is effected by AND-circuits 168 which receive the data signals from I/O register 48. (This latter connection is not illustrated in FIG. 2.) Therefore when a preamble is started by a start pulse, the first byte of data is made more readily available within the control unit by transferring it to the byte store register 160. Upon completing preamble 10 by preamble control 137, an end of preamble signal is supplied through OR-circuit 144 to actuate AND-circuits 147, thereby transferring the first data byte to write circuits 42. It may be noted that the start pulse on line 138 is not supplied until after the channel 30 has supplied a SVC OUT signal indicating that the data byte is available.

The end of preamble signal also conditions the control unit to perform steps 64 through 71 of the write flow chart. This is accomplished by enabling AND-circuit 139 to pass a write clock pulse from line 136 to set steering latch 141. OR-circuit 140 will pass other signals during the write operations for setting steering latch 141 at the end of a write resync as well as during read operations.

Steering latch 141 gates the next SVC IN on line 38 through AND-circuit 142 to generate CHL SVC IN on line 38*a*. This signifies to channel 30 that control unit 32 is ready to receive the second byte of data. The first byte, of course, remains stored in byte storage register 160 until preamble 10 is written.

The tally of the number of data bytes that have been recorded is held in byte counter 143. The contents of byte counter 143 are altered in accordance with steps 65 and 70. Since SVC IN indicates completion of one byte being recorded, the line 38 SVC IN signal is gated through AND-circuit 142 to byte counter 143. The AND-circuit 142 output is also supplied through OR-circuit 173 as the CHL SVC IN signal. AND-circuit 142 is enabled to pass the SVC IN signal only when latch 141 is set (i.e., during recording of data in a write operation).

The SVC IN signal is generated by known circuits. When OTC 33 determines write circuits 42 have recorded a data byte, it generates a SET SERVICE IN (SET SVC IN) pulse. This pulse is supplied over line 190 to set SVC IN latch 191. Latch 191 then supplies the SVC IN DC signal until reset by either a SVC OUT signal, CMD OUT signal, or a later-described PSEUDO SVC OUT (P SVC OUT) signal.

Step 68 is performed in the write resync circuits of FIG. 7. During a write operation, the CMD OUT signal sets WRITE STOP latch 151. CMD OUT together with the line 135 WRITE signal enables AND-circuit 150 to pass the next occurring SVC IN signal for setting WRITE STOP latch 151. Such usage of SVC IN ensures that the meaning of the CMD OUT signal is stop. Remember, as described before, CMD OUT may have several meanings depending upon the inbound signal at that moment. Stop is defined as CMD OUT in answer to SVC IN (i.e., CMD OUT is received after a function is being performed by control unit 32). Reset line 152 indicates that, during initialize, WRITE STOP latch 151 is reset to the inactive condition. When CMD OUT signal is not received, no action is taken.

Then, TEST SVC OUT test stop 69 is performed. SVC IN again samples steering AND-circuit 142 (FIG. 6) to generate CHL SVC IN signal, which alters byte counter 143 by unity and gates out one byte of data from I/O register 41 to write circuits 42. It also notifies channel 30 to supply another data byte for recording.

Completion of writing one set of data signals is determined by B=0 detector 155 (FIG. 6) indicating that byte counter 143 contains zero (B=0). If B=0 is not supplied, the just-described write cycle cycle is repeated. As later described, if B=0, the write resync circuits of FIG. 7 are activated to reset steering latch 141 for terminating the write operation (one set of data signals has been recorded). This action is accomplished when SVC OUT is received over line 37 and B=0. AND-circuit 157 is jointly responsive to these signals and a write signal on line 135 to set END OF DATA latch 158. When set, latch 158 activates the FIG. 7 write resync circuits by setting write resync latch 161. To reset latch 158, AND-circuit 169 jointly responds to write signal on line 135 and the SET SVC IN signal on line 190.

A resync burst, longitudinal check digit and the marker signals are written only after the first byte of data for the next data set to be recorded has been received. Such byte of data is indicated as being available by SVC OUT. SVC OUT is not available during the writing of the check digit, marker signals, and resync signals B. Since no additional SVC OUT is received, a PSEUDO SVC OUT (P SVC OUT) signal is generated to step the later-described write resync recordings. When data signals are being recorded, the SET SVC IN and SVC OUT signals step operations. During resync recording, SVC IN is gated by AND-circuit 195 (FIG. 6) through delay 196 to generate P SVC OUT. AND-circuit 195 is enabled whenever steering latch 141 is reset (data is not being recorded) to simulate responses from channel 30.

The number of resync signals B that have been recorded plus recording the marker signals is tallied in burst counter 163 (FIG. 7). Counter 163 is stepped once each time AND-circuit 162 passes SET SVC IN. Circuit 162 is enabled by write resync latch 161 being set and writing not being terminated, as indicated by a signal on line 213. This signal is described later with respect to stop write sequencing. Counter 163 supplies its signal state indications to burst count decoder 164, which translates all signal states of the counter into one of 35 signal conditions. When burst counter 163 contains unity, step 74 of FIG. 3 is performed. An activating signal is supplied over line 167 (FIGS. 7 and 2) to OTC 33 for gating a check digit over cable 197 to write circuits 42. The generation of such check digits is well known and is not further described for that reason. Steering latch 141 is now reset by AND-circuit 192 supplying a signal over line 166 to AND-circuit 159. The write clock pulse on line 136 is passed by AND-circuit 159 to reset latch 141. AND-circuit 192 only supplies this resetting signal when stop write latch 151 is reset (i.e., not a stop sequence).

At this point, there is a deviation in operation steps between FIGS. 3 and 7. In the FIG. 3 embodiment, step 72 is executed before receipt of SVC OUT. In FIG. 7, SVC OUT is received before a check digit is sent to write circuits 42. Either embodiment is satisfactory. FIG. 7 could be modified to gate the check digit upon B=0 without waiting for SVC OUT.

The next step is to record marker signal 13. In FIG. 7, marker signal 13 is written during the two steps to write the marker signal of all 1's and all 0's and occurs as burst counter 163 steps through counts 2 and 3. At count 2, a write all 1's signal is supplied by decoder 164 through OR-circuit 170 to write circuits 42. When burst counter 163 has a count of 3, a write all 0's signal is supplied through OR-circuit 171 to write circuits 42. Write all 0's or all 1's indicates the appropriate signal is simultaneously recorded in all tracks. This action completes the writing of the marker signal as set forth in step 77 of FIG. 3.

In burst counter steps 4 through 31, a burst of 1's is recorded. Accordingly, when decoder 164 senses that the tally is equal to 4 (K=4), write-all-1's latch 172 is set. It supplies a write-all-1's signal through OR-circuit 170 to write circuits 42. A 1 is written in each and every track during each cycle of the control unit as burst counter 163 proceeds through its count. When counter 163 has reached 32, write-all-1's latch is reset, thereby removing the write-all-1's signal. Also, during burst counter steps 32 and 33, marker signal 15 is recorded by the all-0's and all-1's signals being supplied in that order to write circuits 42. Write resync latch 161 is reset by decoder 164, K=34 signal, thereby terminating the writing of the resynchronization burst of signals. To restart recording of data signals in data set 16, line 175 signal (K=34) simultaneously enables AND-circuit 176 to pass a write clock pulse to set steering latch 141 (FIG. 6), resets write resync latch 161 and gates the first data byte in register 160 (FIG. 6) to write circuits 42. The latter is accomplished by K=34 passing from line 175 through OR-circuit 144 to enable AND-circuits 147 of FIG. 6. Write resync latch 161 being reset terminates resync signal recording. Steering latch 141, upon being set, automatically sequences writing the next set of data signals in the same manner as heretofore described.

The above-described operations for writing sets of alternate data signals D and resynchronization bursts B are repeated until the last byte of data has been recorded. This is signified by channel 30 supplying a CMD OUT signal. The CMD OUT signal sets write stop latch 151 of FIG. 7 to initiate sequences for terminating the writing operation. The write signal on line 135 and SVC IN signal on line 38 jointly enable AND-circuit 150 to pass CMD OUT to set write stop latch 151. Referring now to FIG. 1, it is seen that the last byte of data may occur at any time during the recording of a set of data signals having a maximum length of 1,024 bytes. Therefore, to ensure that the truncated block of data bears the previously described integral multiple relationship to the number of ROC states, it may be necessary to write padding signals P in subset 22*b*. A write termination operation is then initiated which includes writing postamble 24. If CMD OUT is received at the completion of recording a set of data signals, a marker signal and postamble 24 are written. Pad ≠1 detector 216 is connected to the lower order four bit positions or stages of byte counter 143. Therefore, detector 216 detects a byte count within the modulus of ROC 44 to ensure a recording length having an integral multiple number of signals of the ROC 44 modulus.

When CMD OUT is received in a middle of a data set, marker signal 23 is first written followed by a burst of 0 signals represented in FIG. 1 by the padding signals P. In reading in the forward direction, marker signal 23, which is an all-2's byte followed by an all-0's byte, signifies the end of data. Reading in the reverse direction, the postamble (i.e., all-1's), followed by a 0 signal indicates that data set 22 is being read. However, the all-0's bytes indicate no data is to be transferred out of the control unit. However, the byte counter 143 may be tallied such that the count is proper when marker signal 21 is to be read. Data is transferred upon the detection of marker signal 23. Therefore, the write STOP sequence must record an all-1's byte followed by a sufficient number of all-0's bytes to make the length of the data set bear the integral multiple relation to the number of ROC states and then record an all-1's postamble. The above discussion assumes that the check digit associated with the subset 22*a* of that data signal has been written.

Returning now to FIGS. 6 and 7, the STOP signal from latch 151 is supplied over line 200 to delay write terminate circuit 201 (FIG. 7). Circuit 201 enables the termination of write operations to be delayed until after the padding signals and preamble 24 have been recorded. STOP is also supplied to AND-circuit 202 which is jointly responsive to STOP and to write resync latch 161 being reset to supply a stop ends count signal to burst counter 163. The significance of this action is that AND-circuit 202 detects the CMD OUT being received during the recording of data; that is, write resync latch 161 is reset. It is desired to immediately record a check digit. This is accomplished by setting burst counter 163 to unity for supplying a gate-enabled check digit signal over line 167 to OTC 33. This gating is accomplished by the next-occurring write clock signal. Immediately after recording the last data signal, STOP is also supplied through OR-circuit 204 to enable AND-circuit 162 for incrementing burst counter 163 each time a SET SVC IN signal is received over line 190. Circuit 201 supplies a NOT TERMINATE signal over line 213 to enable AND-circuit 162. AND-circuit 192, which is jointly responsive to K=1 and NOT STOP cannot now reset steering latch 141. Rather, as soon as write stop latch 151 is set, is signal on line 200 is supplied through OR-circuit 205 (FIG. 6) to immediately reset steering latch 141. Note that this resetting does not have to wait for a write clock pulse to be emitted by OTC 33. Upon receipt of the next SET SVC IN signal on line 190, SVC IN latch 191 is set. Again, AND-circuit 195 is responsive to steering latch 141 being reset to generate a P SVC OUT signal for stepping OTC 33 through its sequences for enabling the recording of padding signals P. Upon receipt of the P SVC OUT signal, another SET SVC IN signal is supplied for incrementing burst counter 163. Burst counter 163 is incremented in this manner through tallies 2 and 3 for recording marker signal 23. At this time, further incrementing of burst counter 163 is inhibited by delay write terminate circuit 201. When burst counter 163 is equal to 3, a K=3 signal is supplied to delay write terminal circuit 201. It is also supplied through OR-circuit 171 for causing all 0 bytes to be recorded. In delay write terminate circuit 201, AND-circuit 208 is jointly responsive to K=3, the pad counter is not equal to 1, as indicated on line 209, and the stop latch 151 being set to supply an enabling signal on line 210. Signal-inverting circuit 212 is responsive to the enabling signal on line 210 to supply an AND circuit disabling signal to AND-circuit 162 to inhibit further operations of burst counter 163.

Returning now to FIG. 6, it will be remembered that steering latch 141 is reset, thereby closing AND-circuit 142 such that no additional CHL SVC IN signals are supplied. This, of course, prevents the SVC IN signals from altering the numerical contents of byte counter 143. However, it is necessary for byte counter 143 to count the number of padding signals P being recorded. To this end, AND-circuit 214 in delay write terminate circuit 201 is jointly responsive to the enabling signal on line 210, and the SET SVC IN signal on line 190 to supply a counter-stepping signal over line 215 to step byte counter 143. Therefore, byte counter 143 is altered each time an all 0's padding signal is recorded. When the padding count detector 216 no longer supplies a P ≠1 signal over line 209, AND-circuit 208 of delay write terminate circuit is disabled. This corresponds to a numerical count of byte counter 143=1 in the lower order four digit positions. This also corresponds to ROC 44 having a count of unity during a readback operation. This also removes enabling signal from line 210, thereby blocking AND-circuit 214 to stop byte counter 143. It also reenables AND-circuit 162 such that burst counter 163 is then activated to continue through its sequence of operations.

Because of the delays in the circuit, one more clock cycle will occur before burst counter 163 is initiated. It should be noted that when K=3, there is a write all 0's signal being continuously supplied through OR-circuit 171. This same signal is supplied to AND-circuit 208 such that 0's are written while the circuitry is awaiting byte counter 141 to step to its reference state. Having padding count equal to 1 and AND-circuit 162 being reenabled, burst counter 163 resumes operation at the next SET SVC IN signal. This steps counter 163 to 4 wherein write-all-1's latch 172 is set. From there on, burst counter 163 and its associated control circuitry are effective to automatically write postamble 24. Upon K=27 (i.e., before any marker signal can be written by steps 32 and 33), AND-circuit 218 is enabled to generate a signal on line 219 which is supplied to OTC 33. This signal terminates all writing operations (i.e., the amplifiers and write circuits 42 are turned off, for example). This action completes the write operations.

As just described, burst counter 163 together with its control circuitry were used to write the resync burst in the data format and also used to write postamble 24. This saves equipment in that the same hardware is used for two different purposes. In a similar manner preamble 10 could be written using the same burst-counter circuits.

READ HARDWARE

Figure 8:
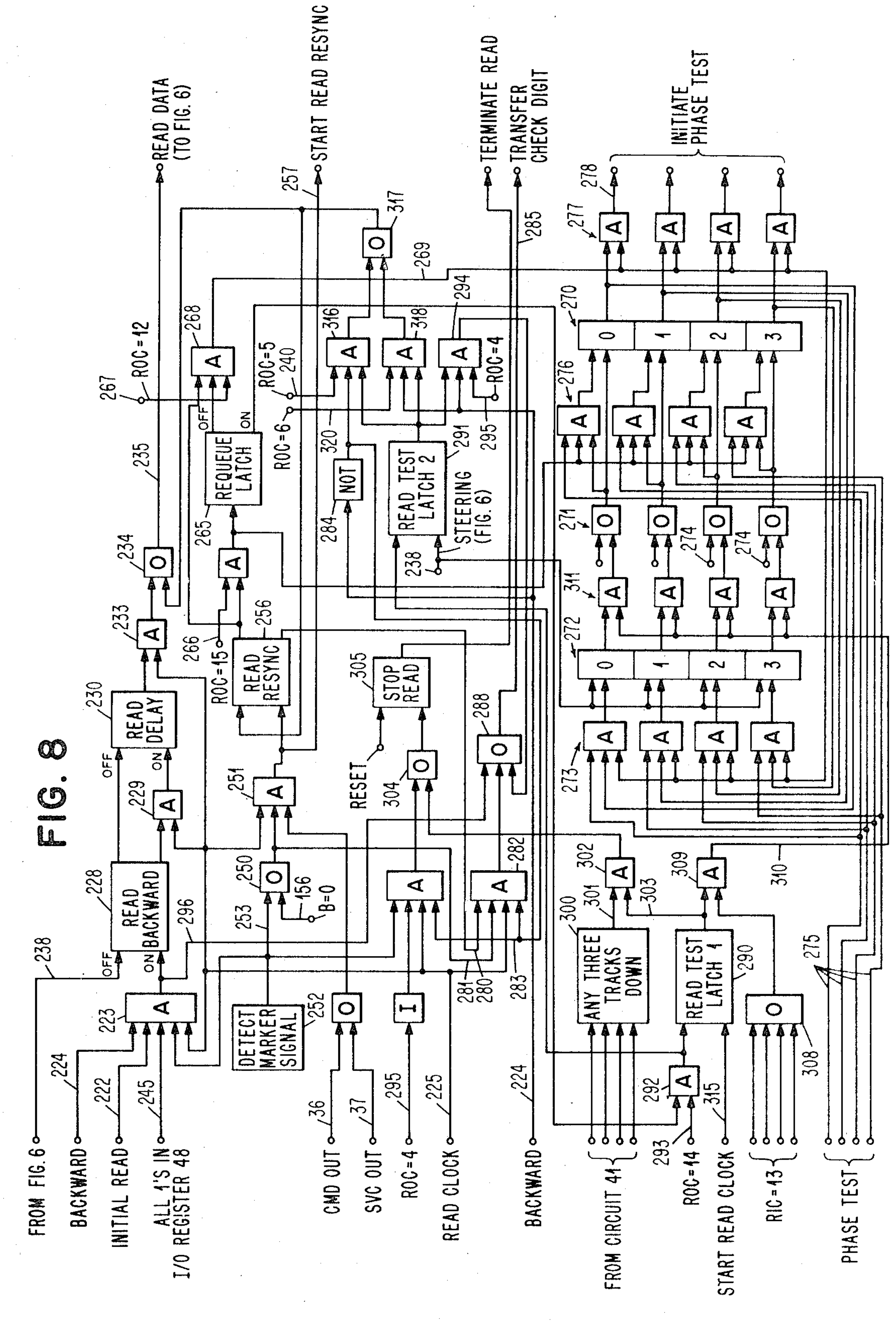
FIG. 8 is a simplified signal flow diagram of a read resynchronization and terminate circuit usable with the FIG. 2 illustrated apparatus.

An illustrative hardware implementation of the read operation is described in the detail with particular reference to FIGS. 6 and 8 and references to FIGS. 4 and 5 for correlating the program and hardware embodiments. This description assumes that OTC 33 has been conditioned for a read operation. It is now awaiting detection of a signal envelope by data sense-and-detect circuit 41. In this instance, initial read latch 220 is initially reset in preparation for initializing the FIG. 6 illustrated circuit. Upon detection of a signal envelope in any track, data sense-and-detect circuits 41 supply a pulse signal over line 221 setting initial read latch 220. This action corresponds to step 100 of FIG. 4. Latch 220 being set enables the performance of steps 101 through 106 and 109 for starting the read sequence. Latch 220 supplies an enabling signal over line 222 for partially enabling AND-circuit 223 (FIG. 8). When reading in the backward direction, backward signal on line 224 is received from OTC 33. The line 224 signal indicates forward when negative and backward when positive. AND-circuit 223 is responsive to a positive signal on line 224 to pass other signals. AND-circuit 223 is not fully enabled until there are all 1's in register 48 as indicated by a positive signal on line 245 and a marker signal has been detected in the backward direction. This corresponds to detection of marker signal 23. In the present illustrated embodiment, data sense-and-detect circuits 41 include circuitry for detecting the first-occurring 1 in any track after a 0 has been read. This corresponds to detection of marker signal 23. At this time, signals recovered by circuits 41 are first supplied to SKB 49. The all-1's byte in I/O register 48 is the 1's byte of marker signal 23; therefore, during the next read clock, the check digit will be transferred into register 48. Therefore, when the last portion of marker signal 23 is in I/O register 48, AND-circuit 223 is enabled to pass the read-clock-pulse setting read backward latch 228. During the next read-clock cycle, generation of which will be described in more detail later, AND-circuit 229 supplies a setting signal to read delay latch 230. This time delay is necessary such that the all 1's in I/O register 48 are removed prior to transferring any signals to channel 30. The next read-clock pulse on line 225 is passed by AND-circuit 233 for setting steering latch 141 of FIG. 6. Steering latch 141 being set signifies the initiation of a readout of subset 22*a* of data signals D. The read data signal (pulse) supplied by AND-circuit 233 is passed through OR-circuit 234, thence over line 235, and OR-circuit 140 to steering latch 141.

The above-described operation corresponds to steps 101, 104, and 109 in FIG. 4. In the program embodiment, the padding 0's were counted. This counting is not absolutely necessary. In the hardware illustration, the padding 0's are not counted. The end of data subset 22*a* is detected only by marker signal 21. Counting padding signals 22*b* would add reliability to the backward read operation. Marker signals are detected in sense-and-detect circuit 41, as will be later referred to in more detail during the reading of actual data signals. Detection of all-1's and all-0's bytes is well known. Included is the known practice of "voting" (i.e., taking seven 1's out of a possible eight 1's as indication of all 1's). If it is desired to count the padding bits, both the byte count and a marker signal can be used for terminating a data read operation. The byte count may be used to identify when a marker signal can be detected. This improvement makes it possible in read backward or in read forward with length argument (predetermined length count) to verify the marker detection by sampling the vote only during selected ROC states. Since it is known during which ROC states the marker must be, the marker detection may be activated only during such states. This selection reduces false marker detection caused by data errors. In addition, since most data blocks are 1,024 (only ending blocks excepted), the use of the count reduces dependence on data detection since the read resync operation may start without marker detection.

Steering latch 141 being set supplies a resetting signal over line 238 simultaneously resetting initial read latch 220 and read backward latch 228 of FIG. 8. This resetting action clears the initial read circuits to enable repetitive reading of data sets.

When the read operation is in the forward direction, step 102 of FIG. 4 is performed. In the illustrated hardware embodiment, step 102 is performed by AND-circuit 239 of FIG. 6. This circuit receives the initial read signal over line 222, the FWD/BKWD signal over line 224 from OTC 33, and the ROC=5 signal over line 240 from ROC 44. AND-circuit 239 is responsive to an activating signal on line 224 to jointly pass the other two signals. AND-circuit 239 supplies a latch setting signal through OR-circuit 140 to set steering latch 141. This action initiates the read data operation. At this time, initial read latch 220 is also reset. The resetting signal on line 238 is also supplied to read backward latch 228 but has no effect thereon because it has remained reset because reading is in the forward direction.

During the above-described initial operation, data sense-and-detect circuits 41 supply no digital signals to deskewing apparatus (SKB) 49 nor to RIC 43. There is a separate detection circuit for each track (i.e., each bit in every byte) when the preamble 10 is being read. Each circuit for the respective tracks sees a string of 1's. Upon the individual tracks detecting the first-occurring 0 after being phase and frequency synchronized during the burst of 1's, that circuit associated with the respective track is activated to begin supplying data signals to SKB 49 and clock signals to the respective RIC 43. Such action in the respective circuits is independent and is a function of the skew of the signals being supplied from tape handler 31. The detection of the first 0 after preamble 10 corresponds to detection of marker signal 11. The first signal supplied from any track to SKB 49 is the one signal in marker signal 11. At this time, the corresponding RIC 43 is preset to 15. Accordingly, when the first data signal from that respective track is received, the corresponding RIC 43 is stepped from 15 to 0. This corresponds to the above-mentioned reference-counting states of RIC 43 and ROC 44. When all RIC's 43 have stepped from 15 to 0, a step (read clock) signal is supplied to ROC 44, causing one byte of data to be transferred to error register 45. Simultaneously, ROC 44 is stepped from 15 to 0. Accordingly, ROC 44 has a numeric count equal to the lowest count in any RIC 43.

The second data byte is completely deskewed in SKB 49 when the last RIC 43 has stepped from 0 to 1. At this time, ROC 44 is also stepped from 0 to 1. The first data byte is simultaneously transferred to read-1 register 46. This process is repeated until I/O register 48 receives all 1's corresponding to the all-1's portion of marker signal 11. There is a timing delay between SKB 49 and I/O 48. This delay is useful in simplifying resynchronization as will become apparent. In the forward direction of reading, the all-1's condition in I/O register 48 is not used; rather, ROC 44 having a numerical count of 5 as determined in step 102 of FIG. 4 initiates the read sequence. It is recalled this step is performed by AND-circuit 239. In the backward read direction, however, it is not known whether or not there are padding signals. The end of the padding signals is signified by the all 1's in I/O register 48, which signal is supplied to AND-circuit 223 over line 245. The next-occurring read-clock signal steps the all 1's in I/O register 48 out and supplies the first data byte from read-3 register 55 to I/O register 48. At this time, steering latch 141 has just been set by the line 235 read data signal for enabling AND-circuit 142. OTC 33 has supplied a SET SVC IN signal, setting SVC IN latch 191. The resulting SVC IN signal is supplied through AND-circuit 142 and thence to channel 30 over line 38*a* as CHL SVC IN. Simultaneously therewith, the same signal is supplied through OR-circuit 246 to alter byte counter 143 by unity. Upon channel 30 successfully transferring such byte of data from I/O register 48, it supplies SVC OUT over line 37 to OTC 33, which resets circuits therein enabling the transferring of one more byte of data. Simultaneously therewith, SVC IN latch 191 is reset, removing the SVC IN signal. Upon occurrence of the next read-clock pulse, the next byte of data is transferred to I/O register 48 and another SET SVC IN signal is supplied for repeating the above-described operation. The transfer of data signals via channel 30 can be faster than the read-back rate. The speed difference enables SKB 49 to be emptied. The read clock is therefore subject to variation in frequency. The read-clock pulse is rapidly supplied by OTC 33 until ROC 44 counts equal the lowest RIC 43 count. This type of operation is well known.

The read-clock pulse is generated in OTC 33 in response to all RIC 43's having counted from a particular count, such as from 4-state to the 5-state (see Floros, supra). Suitable decoding apparatus of known design is used for detection of this function. The read-clock signal is then supplied to step ROC 44 as well as transferring data signals from SKB 49 through the various other buffer registers as above described. These operations are repeated until detection of the marker signal 13 or the completion of byte count as performed in steps 110 and 112, respectively, of FIG. 4. The byte count completion is detected by detector 155 which supplies a B=0 signal over line 156. It may be remembered that this same circuit was used in the write operation. The line 156, B=0 signal, is supplied through OR-circuit 250 of FIG. 8 to enable AND-circuit 251 in preparation to initiate a read resync cycle 111 of FIG. 4. In the particular hardware embodiment, detect marker signal circuit 252 is responsive to all-1's and all-0's signals in data sense-and-detect circuits 41 to supply a marker signal indication over line 253 to enable AND-circuit 251 for passing a latch-setting signal to read resync latch 256. AND-circuit 251 is not enabled to set read resync latch 256 until all of the data has been transferred to channel 30, as indicated by SVC OUT. In the alternative, if channel 30 desires to receive no more data, the CMD OUT signal on line 36 also enables AND-circuit 251.

Simultaneously with read resync latch 256 being set, a resetting signal, start read resync, is supplied over line 257 through OR-circuit 205 to reset steering latch 141. This action terminates the reading of data signals and, therefore, no additional CHL SVC IN signals will be supplied over line 38 until steering latch 141 has again been set. The read resync cycle 111 is now performed.

READ RESYNC HARDWARE

Figure 9:
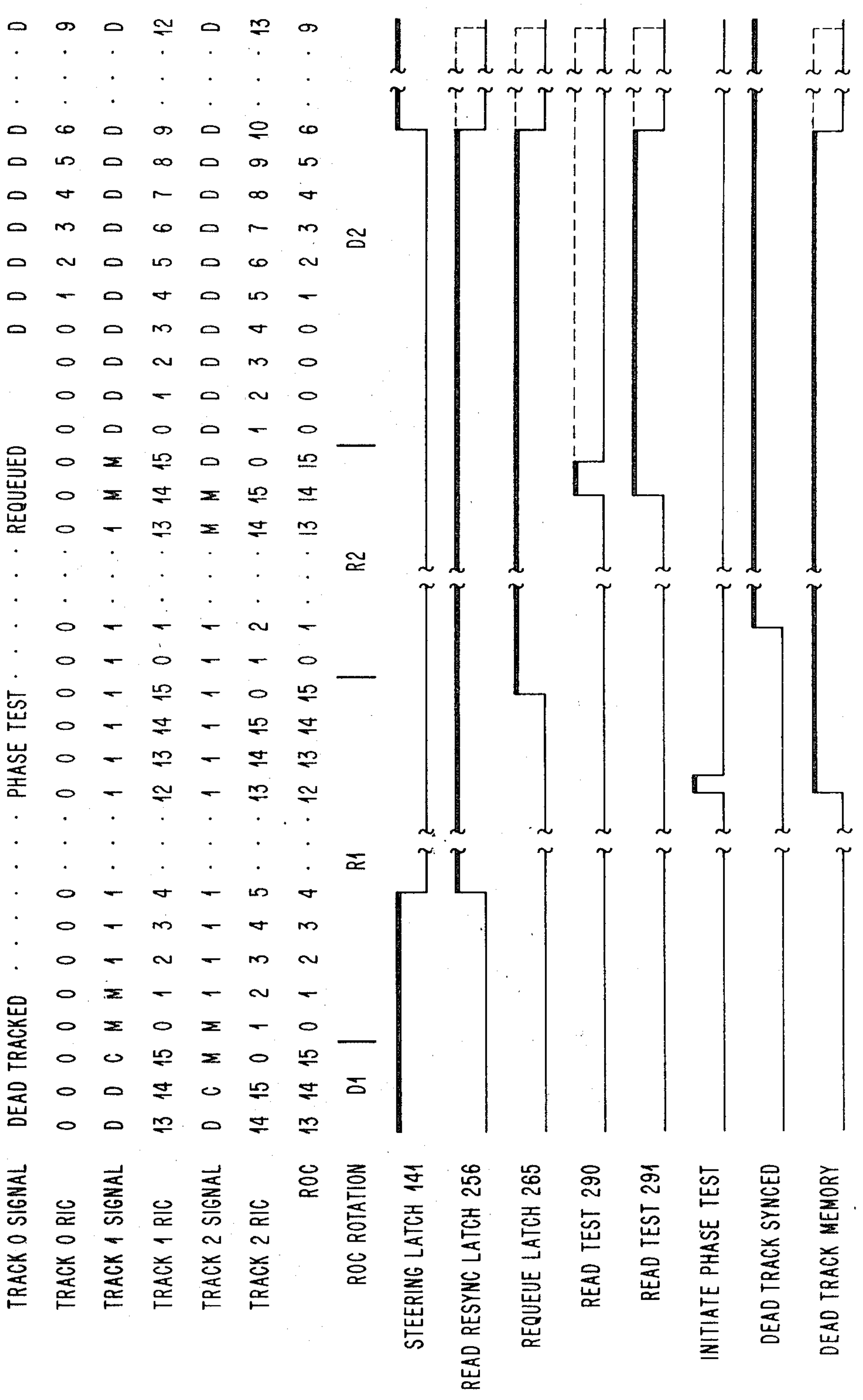
FIGS. 9 and 10 are diagrammatic representations of deskewing with read-back signal information contents and selected control signals during a resyncing operation of a dead track, respectively, for trailing or lagging and leading dead tracks.

In the read resync cycle, many of the control circuits used in writing the resync burst are used. The read resync timing is shown in FIG. 9. For example, steering latch 141 being reset enables AND-circuit 195 to pass SVC IN for generating P SVC OUT which is supplied to OTC 33 for cycling the control unit through its steps. P SVC OUT is also supplied over line 194 to reset SVC IN latch 191. In addition to such sequence controlling, the read resync circuits of FIG. 8 must determine the success or lack of success in establishing read operations of the particular track while reading resync signals. The operation sequence is the same for reading in the forward or reverse direction.

Referring back momentarily to FIG. 5, step 118 transfers the check digit to OTC 33. This step is performed during the first part of resync cycle 111 when reading in the forward direction. This is accomplished before read resync latch 256 is set. The check digit is transferred immediately at the end of the data set, as indicated by either B=0 on line 156 or marker signal has been detected as indicated on line 253. These signals are supplied from OR-circuit 250 over line 281 to AND-circuit 282 which detects the proper time to transfer check digit in accordance with step 118. The read forward signal is supplied over line 283 from inverter circuit 284 while read resync latch 256 supplies its "OFF" signal over line 280. Read clock on line 225 is then passed by AND-circuit 282 through OR-circuit 288 to line 285. At this time the check digit resides in I/O register 48 and is transferred thereby over cable 286 to OTC 33 (FIG. 2). Gating circuits for transferring the signals from I/O register 48 to OTC 33 may be either within register 48 or OTC 33 but are not shown for simplifying the drawing.

Before describing read resync, the condition of the FIG. 8 circuits during dead-tracking are described. Upon detection of a dead track by sense-and-detect circuit 41, as by a detected phase error or loss of read-back signal amplitude, a dead track latch 270 associated with such track is set to the active condition. A signal on one of the lines 274 from sense-and-detect circuit 41 passes through an OR-circuit 271 to set the appropriate latch. There is one dead track latch for each track. Dead track latches 270, when set, are operative to inhibit transfer of data signals from data sense-and-detect circuit 41 for the particular track being dead-tracked and remove that track from the ROC controls and marker-voting circuits. Dead track latches 270 remain set until the dead track has been successfully resynced. During the entire read resync cycle 111, control unit 32 must remember which track was dead prior to initiation of the read resync cycle. In addition to dead track latches 270 being set, dead track memory latches 272 are selectively set by the later described phase test signal. The output signals of dead track latches 270 are supplied respectively to a plurality of AND-circuits 273 for enabling same in accordance with the dead-tracking operations. For each dead track, sense-and-detect circuits 41 perform a phase test to determine successful frequency resynchronization. If this test is successful, an activating signal is supplied over the respective one of lines 275 to an AND-circuit 273. The line 269 phase-test-sensing signal samples all of the AND-circuits 273 for selectively setting the dead-track memory latches 272. Therefore, memory latches 272 are only set for a dead track that has successfully been at least temporarily resynced as indicated by a phase test signal on the respective line 275. These memory latches remain selectively set during the remainder of resync cycle 111 such that, if a particular dead track does not continue in synchronization, the corresponding dead-track latch 270 may be again set for redead-tracking the particular track while reading the next-occurring set of data signals. Dead-track latches 270 are reset only if the respective line 275 phase test signal remains on until ROC=15 during rotation R2. AND-circuits 276 respectively sense such conditions for selectively resetting dead-track latches 270. Tracks having successful read-back operations are not effected during read resync cycle 111. The success of the synchronization of a dead track in circuits 41 is detected by the successful detection of a predetermined number of detected data pulses therein. This detection is indicated in FIG. 9 by the phase test signal going "ON." Such successful synchronization detection and the subsequent detection of a long wavelength (a 0) followed by a pulse at data time (a 1) in that particular circuit causes the corresponding RIC 43 to be preset to 15.

FIG. 8 is described in detail with further reference to FIG. 9 which illustrates the timing and positional relationships between the various illustrated tracks 0–3 and of the electronic circuitry during a read resync operation. FIG. 9 illustrates portions of four ROC 44 rotations; that is, ROC 44 completely cycles from 0 through 15 four times in the FIG. 9 illustration. The first-occurring rotation is labeled D1 and represents the last ROC rotation in the set of data signals just being read. In rotations R1 and R2, the resync signals are read. In rotation D2, the succeeding set of data signals following the reading of resync signals are read. As pointed out above, with respect to Table I, the resync signals including marker signals and other control indicia takes two ROC rotations. Since SKB 49 is designed to accommodate maximum leading or maximum lagging skew, the resync signal being equal to twice that number accommodates extreme leading *and* lagging skew in a dead track for enabling the requeuing of a reactivated track into SKB 49 under either extreme leading or lagging conditions. The requeuing circuitry and the method of requeuing is described with respect to FIG. 9.

At the completion of ROC 44 rotation D1, ROC 44 has a numerical content of 15. This signifies the beginning of the resync cycle; however, because of the above-mentioned delay between SKB 49 and I/O register 48, read resync circuitry of FIG. 8 is not conditioned for resync operation until the reading transducers of the tape handler 31 have progressed substantially into ROC rotation R1. A condition precedent for resync operation is then SVC OUT has been received from channel 30. This does not occur until the last byte of data has been made available to channel 30 of ROC=4. Accordingly, steering latch 141 is not reset until ROC=4 in rotation R1. Referring now to FIG. 6, steering latch 141 is reset by the start read resync signal supplied over line 257 from the FIG. 8 illustrated read resync circuits. Resetting latch 141 terminates the read operation such that no further CHL SVC IN signals are supplied to channel 30. Henceforth, during read resync cycle 111, P SVC OUT signals are supplied from delay circuit 196. In FIG. 8, the first action during a forward read resync cycle is to condition AND-circuit 251 for resetting read resync latch 256. AND-circuit 251 is conditioned either by signal B=0 supplied from byte counter detector 155 over line 156 or a marker signal indication supplied over line 253 by detect-marker signal circuit 252. OR-circuit 250 permits either situation to condition AND-circuit 251 to pass the next-received CMD OUT or SVC OUT to set read resync 256. Referring to FIG. 9, it is seen that AND-circuit 251 is conditioned when ROC 44 has a count of 1 in rotation R1. This time corresponds to the successful reading of the marker signal MM in rotation R1. Upon receiving SVC OUT, AND-circuit 251 passes a read-clock-pulse-setting read resync latch 256 to the active condition. In FIG. 9, a set latch is indicated by the heavy horizontal line aligned with "ON." This setting signal goes over line 257 to reset steering latch 141 as previously described. Read resync circuits of FIG. 8 are now fully conditioned to proceed with the resync operation.

During read resync cycle 111, the burst of all-1's bytes is supplied through SKB 49 and the remainder of buffer registers 40. Because there is no CHL SVC IN signal supplied to channel 30, none of these 1's will be transferred out of the control unit 32. Whether or not the burst of 1's is permitted to proceed through the buffer registers 40 is a design choice. It is believed that the reliability of control unit 32 is enhanced by permitting all of the signals to be processed within control unit 32 as data.

After read resync latch 256 has been set and before requeue latch 265 is set by ROC=15 signal on line 266 during rotation R1 for enabling requeuing of a reactivated track into SKB 49, a phase test is initiated in each of the circuits 41 associated with the dead track. AND-circuit 268 is jointly responsive to requeue latch 265 being reset (i.e., off), read resync latch 256 being set, and ROC=12 which occurs during ROC rotation R1 to supply an initiate phase test signal over line 269 to a set of AND-circuits 277. AND-circuits 277 are jointly responsive to the respective dead-track latches 270 being set and to initiate the phase test signal to supply a phase-test-activating pulse over the respective lines 278 to sense-and-detect circuits 41. In the present instance, only track 0 is being dead-tracked and, therefore, only the line 278 associated with that dead track will carry an activating signal. If the phase test is successful (i.e., the dead track is resynced), the set dead track latch 270 transfers its signal through the respective AND-circuit 273 to set one of the dead-track memory latches 272. Latches 272 retain information in control unit 32 of which track was dead to ensure such information is not lost during the latter portion of read resync cycle 111, as will become apparent. These memory latches are reset at the end of the resync cycle by steering latch 141 set signal received over line 238.

Whether or not resync of a dead track has been successful is determined during ROC rotations R2 and D2. To condition the read resync circuits for such determination, read test latches 290 and 291 are set when ROC=14 during rotation R2. This is step 125 of FIG. 5. During this time, the quality of read is also detected. In an eight-track system, for example, if three of the tracks are not supplying signals through data sense-and-detect circuit 41, it is either end-of-block or a sufficiently poor operation to cause the reading operation to be aborted. OTC 33 includes known circuits to distinguish between end-of-block and a read error, such as could be caused by a creased tape. This corresponds to step 126 leading to STOP READ block. In FIG. 8, detector 300 detects that any three tracks are down; that is, any three tracks are not supplying a sufficient signal amplitude to enable circuit 41 to successfully detect data. When such condition exists, an enabling signal is supplied over line 301 to enable AND-circuit 302. AND-circuit 302 will pass the read-1 test latch 290 set signal on line 303 to OR-circuit 304 for setting STOP READ latch 305. Latch 305 being set supplies a terminate read signal to OTC 33, which then stops all reading operations. Simultaneously therewith, OTC 33 sends a status signal over cable 35 to channel for indicating that read operations are ended. Latch 305 had been initially reset by OTC 33 during startup operations.

After the read test latches 290 and 291 are set, the read resync loop consisting of steps 126, 127, and 128 of FIG. 5 is performed. In this mode, control unit 32 merely idles without performing any data transfer functions and is repeated until either any RIC=13 or all tracks are being successfully read as indicated by step ROC to 0. This idling occurs in ROC rotation R2 and the first part of ROC rotation D2. Any RIC reaching 13 before step ROC to 0 indicates that the previous dead track has not been successfully resynchronized. This is more easily understood by referring to the FIG. 9 illustration of requeuing a dead track into SKB 49. It is recalled that SKB 49 has 16 registers, which is slightly greater than the maximum allowable skew in the tape-transport system. By definition, which is not important to the present invention, the maximum allowable skew in the illustrated system is 13 byte positions on the tape. Therefore, if any RIC=13 and ROC 44 has not been stepped to ROC=5, the previous dead track has not successfully transferred data signals to SKB 49. In accordance therewith, step 129 is performed for redead-tracking the previous dead track. The hardware used to accomplish steps 127 through 129 is now described. In step 127, the RIC's are sensed. OR-circuit 308 of FIG. 8 receives input from all RIC 43's. An active input indicates that a particular RIC=13. Such active signal is supplied to AND-circuit 309 which was enabled by read test latch 290. When any RIC=13 during R2 or D2, AND-circuit 309 supplies a signal over line 310 to sample all AND-circuits 311 for reinstituting dead-tracking. AND-circuits 311 are enabled by the respective dead track memory latches 272 to transfer their signal contents to dead-track latches 270. Memory latches 272 are reset by the steering latch 141 set signal on line 238. Such action may occur after ROC=15 in ROC rotation R2. Dead-track latches 270 could have been reset by a signal from an AND-circuit 276. Then, for some reason, the signal amplitude could again fall. AND-circuits 311 are provided to set the appropriate dead-track latch 270 should this occur. Also, note that if a dead track is not supplying read-back signals, none of the above-described action occurs, thereby maintaining dead-tracking.

If step 128 is successfully performed, the reenter read sequence 130 is initiated. When ROC 44 is first stepped, OTC 33 supplies a start read-clock pulse over line 315 resetting read test latch 290. This disables AND-circuit 309 and prevents step 129 from being performed. Of course, the start read-clock pulse on line 315 is not supplied by OTC 33 until after all tracks have supplied the 0 signal of a marker signal after processing a string of 1's from their respective resync bursts. Read test latch 290 being reset corresponds to step 128. Read test latch 291 remains set until after steering latch 141 is set. At that time, read test latch 291 is reset by the signal on line 238 received from FIG. 6.

In the reenter read sequence 130, steps 131 and **102*a* are jointly performed by AND-circuit 316. AND-circuit 316 is jointly responsive to the ROC=5 signal on line 240, read test latch 291 being set, and forward signal on line 283 to supply a latch-altering signal through OR-circuit 317 to reset read resync latch 256 and simultaneously set steering latch 141. In a similar manner, AND-circuit 318 performs both steps 131 and 134 to cause reentry of the read sequence in the backward direction by simultaneously resetting read resync latch 256 and setting steering latch 141. AND-circuit 318 is jointly responsive to the ROC=6 signal on line 320, read test latch 291 being set, and the backward signal on line 224 to supply its latch-altering signal through OR-circuit 317. Prior to this time, in the read backward sequences, steps 132 and 133 are jointly performed by AND-circuit 294**. This was previously described with respect to the transferring check digits.

Steering latch 141 having been set initiates reading data signals as described above. Such set of data signals is read until another resync burst is to be read. Such cycles are repeated until detector 300 detects that there is no longer a read envelope from three or more tracks or the readout counter is not in the correct state, which indicates that postamble 24 has been read.

Reading in the backward direction is the same as in the forward direction, except as stated below. These differences are best understood by reviewing Table I, then reading the following description while observing FIG. 10. During a backward read, immediately after postamble 24 has been read, the check digit associated with the data subset **22*a* must be transferred after detection of marker signal 23. AND-circuit 223 sets read backward latch 228 and simultaneously supplies a signal over line 296 to OR-circuit 284 for transferring the check digit. AND-circuit 223 is jointly responsive to the initial read latch 220 being set, backward signal on line 224, all 1's in I/O register 48, a marker signal having been detected, and read-clock pulse to set latch 228. In each instance of transferring a check digit, I/O register 48 either has an all-1's condition in the read backward mode or the last byte of data being transferred to channel 30** in the read forward mode.

The first portion of read resync cycle 111 in a read backward direction is different than in the forward direction. See steps 119–124 of FIG. 5 which are performed by read backward latch 228, read delay latch 230, and associated circuits shown in FIG. 8.

In the backward direction of data signals to be read, the check digit must be transferred as in step 133. In a resync cycle 111, transfer of a check digit is effected by one of the two read test latches 290 and 291. These two latches are set after requeue latch 265 has been set to the active condition for enabling AND-circuit 292. As soon as ROC=14, AND-circuit 292 is enabled by the line 293 signal to set latches 290 and 291. The check digit is transferred from I/O register 48 when AND-circuit 294 supplies a transfer check digit signal. AND-circuit 294 is enabled jointly by the backward signal on line 224, read test latch 291 being set, and ROC=4 signal supplied over line 295.

REQUEUING

Figure 10:
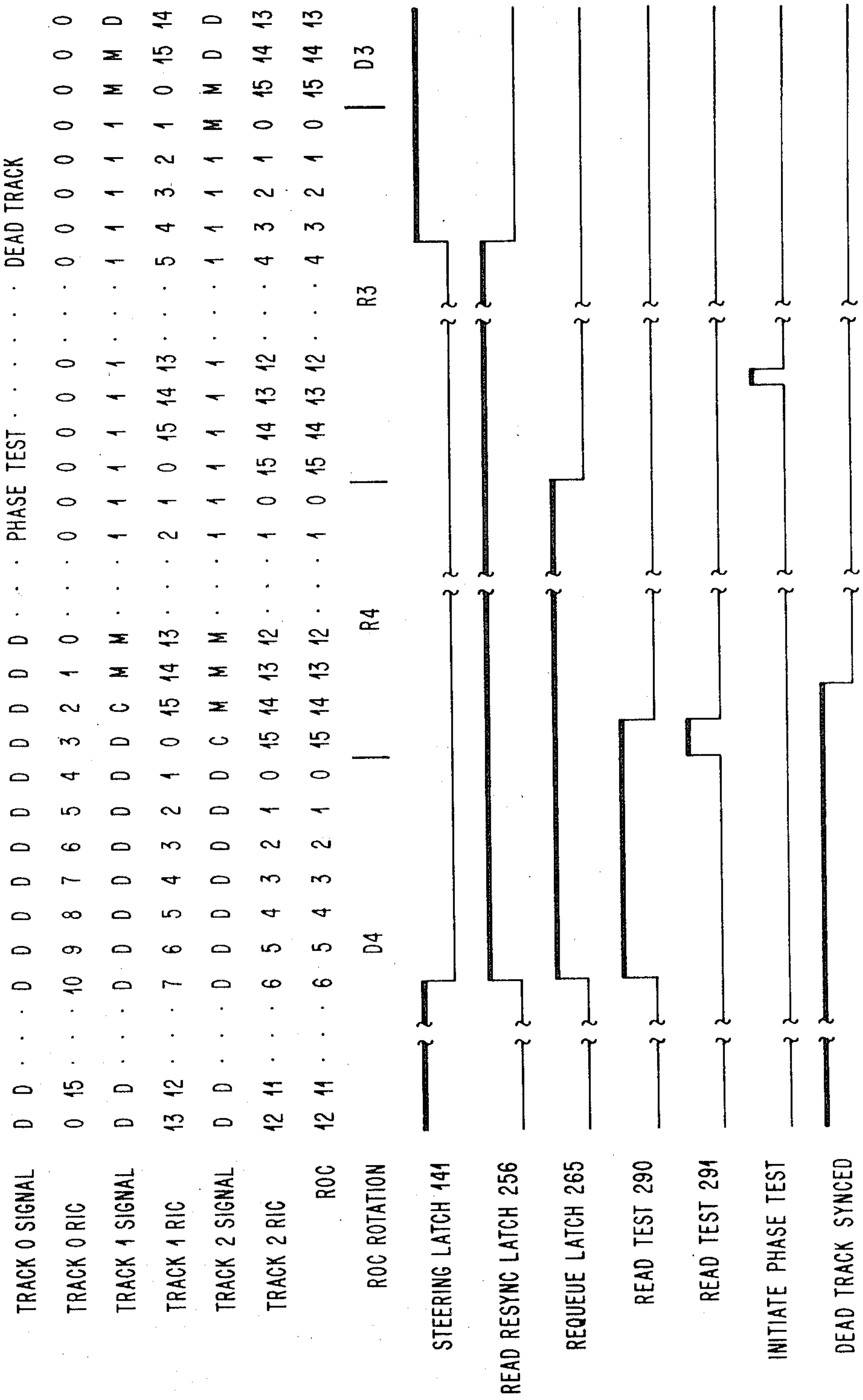

FIGS. 9 and 10 illustrate in numerical form the requeuing of a dead track into SKB 49. It is important that when a dead track is resynchronized, it should supply its first data signal at the appropriate time such that read-back operations can be successfully performed. The above-described operations are effective to allow maximum skew between a dead track and an track that is successfully operating. This, of course, means that the dead track may have maximum leading skew, maximum lagging skew, or any skew amount therebetween. The resync bursts were selected to accommodate this maximum skew in both directions (i.e., slightly longer than twice the maximum skew). According to some known characteristics of tape-handling systems, it may be determined that the amount of skew a dead track can lead the trailing operative track is greater than the amount of skew a dead track can lag such operative tracks. In accordance therewith, the skew allowance within a resync burst could accommodate a greater leading skew than a lagging skew of a given dead track. To accomplish this in SKB 49, ROC 44 is designed to reach its reference condition (i.e., changing from numerical count 15 to 0) at approximately the center of a resync burst. In those instances where the dead track can lead the trailing operative tracks more than it can lag, such reference condition is selected to occur slightly before the time the transducer reads the middle-1 signal of the resync burst. For example, if the resync burst has a string of 28 binary 1's, ROC could reach its reference state when the leading track reads its 10th 1 in the string of 1's. This is by example only with no limitation thereto intended.

The discovery of a dead track more probably leading than lagging materially affects design of the resync burst. Assuming a linear skew, a leading dead track in an eight-track record system can be eight bit positions or cells ahead of the most lagging track. When the most lagging track is being dead-tracked, the next most lagging active track controls ROC 44. Therefore, the lagging dead track is lagging ROC 44 count by unity. Therefore, the leading skew as measured with respect to ROC 44 is greater than when lagging. Also, it is readily apparent the chances of leading ROC 44 count are greater than lagging.

When skew between tracks is affected by intergap scatter (i.e., all gaps in a transducer are not perfectly aligned), the probabilities and timing relations are different. The basic discovery of these relationships remain an important factor in intrarecord resynchronization when a burst of signals are used to define the actual relationships between various tracks in the record system.

Referring next to FIG. 10, an exemplary intrarecord resync in the backward direction with the dead track leading is shown. Read FIG. 10 from right-to-left, which reflects the direction of tape motion. Again, four ROC rotations are shown: D3, which is the ROC rotation from the just-read block of data, rotations R3 and R4 during read resync cycle, and D4 for the succeeding block of data. Again, track 0 is shown as being dead. The timing is identical to resyncing in the forward direction. A difference is that ROC counting does not pause during resync. Note that track 0, when resynced, leads the other tracks such that its data signals are in SKB 49 before the most-lagging active track supplies its signals thereto. In view of the detailed description of FIG. 9 and its resync, FIG. 10 is not further discussed.

In the event that the attempted resynchronizations illustrated in FIGS. 9 and 10 were not successful, the timing would be different. In the latter case, in either direction of reading, read resync latch 256 remains on and steering latch 141 remains off until the first RIC reaches 13. In FIG. 9, this is track 2, while in FIG. 10, it is track 1. In the event of unsuccessful resyncing, the track 0 RIC does not count. In read resync circuits 50, requeue latch 265, read test latches 290 and 291 remain on until the leading track RIC reaches 13. All of the other signals would be the same except that the dead-track-synced signal would never be active. Also, it should be noted that the dead-track memory latches 272 would not be set since no activating signal is supplied over any line 275. Since the dead-track latch 270 has not been reset, the dead track continues to be dead-tracked in the next succeeding data set.

The above descriptions have been for recording and reading with no predetermined length count of data bytes. In the event that it is desired to provide a recording system usable with a predetermined number of signals to be recorded or read, circuitry in addition to that illustrated would have to be utilized. In addition to the counters provided in the control unit 32, a "set counter" (not shown) would be provided to indicate the number of data sets to be written or read back. Usually a pad counter separate from the byte counter and preset capability for the byte counter is required. The reasons for these arrangements will become apparent when the present invention is practiced within the latter criteria of length count. In the event there is a partial set of signals, such as set *22a* of FIG. 1, the set counter would probably be set to the number of full sets plus the partial set. In each operation the set counter is sampled at initial time to determine whether or not only one set of signals is to be processed. Such counter is then decremented. If, at the end of any set of signals, the set counter equals 0 and a partial set remains, the byte counter is preset to the partial set and counted down. If at the end of any set of signals, both the set counter and the byte counter illustrated in FIG. 6 equals 0, the processing operation is terminated. In the case of a record operation, if the set count equals 0 and the byte count is nonzero, then padding signals are written to complete the set as previously described. The same general procedure is followed in the read-back operation as it would be applied to the described read-back operations. It is understood, of course, that other modifications can be made to control unit 32 and still practice the spirit of the present invention.

INTRARECORD RESYNC WITH RECORD CODES

Some recording systems record data in each track as permutation code groups. The readback circuitry in such instances will read such code groups and then convert such code groups into data signals. In a nine-track system, for example, eight tracks could be data tracks, while the ninth track is a parity track. In the eight data tracks, there would be eight bits in each byte of data with the plurality of bytes making up eight parallel-recorded permutation code groups, one code group in each track. Such permutation code groups are often chosen because of the signal characteristics obtainable by limiting the permutations to selected combinations. An example of such a permutation code group is one wherein four bits of data in a data-processing code are converted into a five-bit permutation-recording code. While more cells in a channel are required for recording the five-bit record code, as opposed to the four-bit data-processing code, signal-recording channel characteristics are improved to such an extent that the effective density of data on a given area of media is increased. The increase in recording density apparently is accomplished by limiting the selection of permutations within each code group and between successive code groups. In one such type of recording permutation codes used in NRZI recording, the number of zeros in a row has been limited to two. This run-length limit on zeros reduces the bandwidth and the peak shift normally found in high-density magnetic-recording systems. The present invention may be easily practiced with such types of recording systems.

Figure 11:
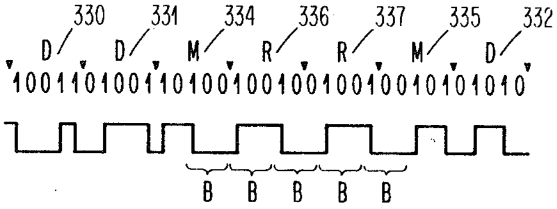
FIG. 11 illustrates a resync signal having a pattern of 1's and 0's in a run-length limited recording code.

A set of resync signals usable with a permutation code group type of recording is illustrated in FIG. 11. Recording is NRZI wherein a transition represents a binary 1, and no transition represents a binary 0. A five-bit permutation-recording code group is used with the maximum number of zeros in a row being limited to two. The code group boundaries are represented in FIG. 11 by the heavy carets. The resync pattern is identified by an illegal code group without violating the run-length limit of the code group, thereby preserving bandwidth and phase shift characteristics within the resync signal. This is important for ensuring proper operation. Three data code groups 330, 331, and 332 are shown bracketing the four-code group resync signal including two marker signals 334 and 335 and two resync code groups 336 and 337. In the data code groups, a maximum of two zeros within the code group is permitted, while at either extremity only one zero is permitted, such as shown in code groups 331 and 332. Marker signals 334 and 335 are characterized by having an outer one respectively adjacent code groups 331 and 332; then a 0, a 1, and a pair of zeros adjacent resync code groups 336 and 337, respectively. The latter two zeros adjacent the code group boundaries is an illegal data pattern. In a byte-oriented system, such as the one described in this specification, marker signals 334 and 335 are recorded in all tracks across the channel in the same manner as the all-0 and all-1 marker signals of FIG. 1 were recorded. The resyncing signal characteristic of the code grouping is labeled B and consists of a series of the maximum allowable long wavelengths of the system (i.e., the space between two successive transitions). This is represented by the pattern: 1001001001001001. This pattern can never occur in legally recorded data in any of the tracks.

A control unit effective to record and resynchronize on the FIG. 11 illustrated code groupings would, of course, require circuitry in addition to that illustrated in the present application. For example, there must be an illegal pattern detector which would detect the two zeros at the inner portion of marker signals 334 and 335. It should be noted that in this system, an all-1's byte occurring just once in five bytes of permutation code groups can occur within the data. Therefore, in addition to the all-1's, all-0's, all-1's and two all-0's bytes, there should be an illegal pattern detector for each track. It should also be noted that the code groups 334 through 337 are symmetrical; that is, the signal pattern going through in either direction is the same. This is consistent with the teaching of this invention for enhancing bidirectional reading and bidirectional intrarecord resynchronization. Track position information is included in the pattern BBBBB (B=100) by the transitions within the illegal pattern.

ROC CONTROLLED READ/RECORD

Figure 12:
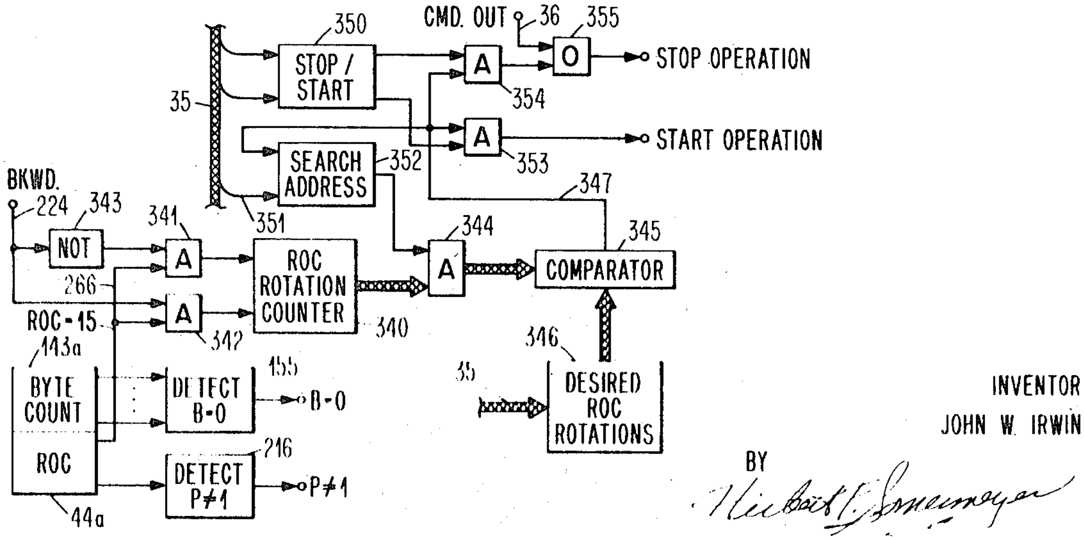

Inspection of Table I and of FIGS. 1, 9, and 10 reveals that the data format is based upon an integral multiple of ROC 44 rotations. As previously described, this facilitates bidirectional intrarecord resynchronization. This ROC-rotation-count-determined formatting is also useful in addressing data on the tape. Each block of data on the tape occurs at a predetermined number of ROC rotations from a reference point on the tape (i.e., the beginning or end). In addition, each set of data signals within a block of data will also have a unique location on the media expressible in numbers of ROC rotations. Individual data signals within a set are also subject to such addressing at least in blocks of the number of SKB registers, in this case 16. FIG. 12 illustrates simplified control means suitable for addressing data recorded on a magnetic media as a function of ROC 44 rotations. ROC rotation counter 340 tallies the rotations as a function from the beginning of the tape. When ROC 44=15, as indicated by the signal received over line 266, AND-circuits 341 and 342 selectively pass that signal to increment ROC-rotation counter 340 in the forward direction and decrement it in the backward direction. Circuit 343 inverts the backward signal such that both AND circuits can be positive logic. The signal state of ROC-rotation counter 340 is supplied through AND-circuits 344 to comparator 345. The desired number of ROC rotations is inserted into register 346. The signal state of register 346 is also supplied to comparator 345. Upon coincidence of the two rotation counts, an activating signal is supplied over line 347 to perform a function as defined in control unit 32 by channel 30. This function can be initiate write, stop write, initiate read, stop read, or any other function that may be desired.

To illustrate how this is accomplished, a simplified circuit is shown for initiating and stopping an operation, be it either read or write. Additional circuitry, such as additional AND circuits may be necessary to guide the resultant output signals to the appropriate latches in FIGS. 6, 7, or 8. Suitable control signals are received over cable 35 which selectively set or reset start/stop latch 350. In this illustration, the desired rotation count in register 346 must either stop or start the operation being performed. To initiate the operation, a signal received over line 351 from cable 35 sets search latch 352. Latch 352 enables AND-circuit 344 to pass ROC rotation counts to comparator 345. When AND-circuit 344 is blocked or disabled, comparator 345 is ineffective to supply any activating signals over line 347.

Assume that start/stop latch 350 is reset such that a start operation at desired address in register 346 is to be performed. AND-circuit 353 is enabled by latch 350. Comparator 345, upon detection of coincidence of rotation counts and desired rotation counts, supplies an activating signal through AND-circuit 353 to initiate the desired operation—read or write. Simultaneously, search latch 352 is reset, thereby preparing the control means for a new addressing operation. On the other hand, if start/stop latch 350 has been set, AND-circuit 354 is enabled. The line 347 signal then is passed through AND-circuit 354 to OR-circuit 355. OR-circuit 355 also receives CMD OUT signal on line 36 and is supplied to the appropriate stop latch in FIGS. 7 or 8 and other circuitry associated with the CMD OUT. This signal indicates a processing, whether it be read or write, be stopped. The described terminate sequences are then initiated.

When the record format is held to an integral number of ROC rotations, certain economies may be achieved in control unit 32. In FIG. 12, the byte counter 143*a* corresponding to byte counter 143 of FIG. 6, additionally includes ROC 44*a* as the lower order digit positions. Therefore, one counter replaces two counters. This fact further illustrates the close relationship between SKB 49 and data format.

The just-described control means can be a portion of a microprogram. The programming of the described control functions is well known.

While the invention has been particularly shown and described with reference to preferred embodiments thereof, it will be understood by those skilled in the art that various changes in form and details may be made therein without departing from the spirit and scope of the invention.

What is claimed is:

1. A multitrack-record system for processing digital data signals with recording circuits and read-back circuits having dead-tracking capabilities and for being in operative association with a record media relatively movable with respect to magnetic transducers in either direction along a given path, a byte being a group of signals having one signal respectively associated with a track, the improvement including in combination:

data means for selectively establishing digital data signal-processing operations in said circuits, said operations processing digital signals to and from said record media, said digital signals exhibiting predetermined frequency characteristics, resync means operatively coupled to said circuits for selectively establishing resync signal processing operations in said circuits for processing resync signals having frequency characteristics within said predetermined frequency characteristics, control means including cycling means and capable of interrupting said data means operations for interleaving an operation by said resync means, said resync means being responsive to said interruption to effect processing of said resync signals, said resync signals exhibiting at least one unique signal characteristic not found in said digital signals for indicating position of said resync signals on said media, and said data means including means for detecting and indicating positional relationships between said tracks by said resync signals and including further means for establishing said predetermined frequency relation between said resync signals and said data means.

2. The multitrack-record system of claim 1 wherein said resync means effects recording resync signals having symmetry along each track such that any read-back signal generated from said recorded resync signal is the same in either direction of relative movement between said record media and said magnetic transducer.

3. The multitrack-record system of claim 1 wherein said media is selectively transported in opposing directions, said data means being operative to process said digital signals read back from said media in either direction of media transport, deskewing apparatus including readout counter means (ROC means) for tallying deskewed signal bytes, said deskewing apparatus having a predetermined number of deskewing positions with said ROC counting said predetermined number once each ROC rotation, the improved combination further including:

counting means in said cycling means for counting and indicating an integral multiple of said ROC rotations and for controlling said data means and said resync means to establish signal processing operations in said record and readback circuits which process a number of digital signals to or from said media equal to an integral multiple of said ROC rotations.

4. The multitrack-record system of claim 3 further including in combination:

means for tallying said ROC rotations, address means for establishing a desired ROC rotation tally function means for receiving said ROC rotation tallies and jointly responsive to a predetermined relationship therebetween to initiate a predetermined function in the multitrack-record system.

5. The multitrack-record system of claim 3 wherein said readback circuits have an output register and a signal delay means coupling said deskewing apparatus to said output register, said delay being a predetermined portion of an ROC rotation such that the last read byte of data signals in a given ROC rotation reaches the output register after said ROC has performed part of a new ROC rotation, said ROC having a reference state from which ROC rotations may be tallied, said reference state having a predetermined relation to boundaries between resync and digital signals recorded on said media, said record media being subject to skew such that signals supplied to said deskewing apparatus have a predetermined maximum skew, said control means activating said resync means only after said last byte of data has reached said output register such that the first few counts of said new ROC rotation during readback of resync signals is bypassed for inhibiting selected resync circuits in said resync means from operation whereby said digital signal delay effects a cycling operation in said control means.

6. The multitrack-record system of claim 3 wherein said resync means is operative upon being initiated to effectively make any dead track appear as the most leading track and being operative to await successful resynchronization of said dead track and reinitiating ROC operation upon the successful read-back from such resynchronized track.

7. The multitrack-record system of claim 6 further including in combination:

means responsive to one of said tracks being active and reaching a predetermined skew position with respect to said dead track to reinitiate dead tracking of said previous dead track and, simultaneously, effecting readout of said active tracks.

8. The multitrack-record system of claim 5 wherein said data means includes burst-cycling means for writing a burst of resynchronization signals bracketed by marker signals and supplying a timing signal for effecting the recording of an error-checking digit, said control means including cycling means operatively controlling said burst-counting means for effecting recording of one said bracketing signals having the same number of synchronization signals as appear in said resync signals.

9. The multitrack-record system of claim 1 having a predetermined number of bit positions of skew between its tracks, and wherein said resync means activates said record circuits to record resync signals having a number of byte positions equal to about twice said predetermined number, including marker signals at each end of the resync signals having symmetrical characteristics such that when said read-back circuits read such resync signals in either direction the readback waveform pattern is the same, and a plurality of like signal patterns extending between said marker signals.

10. The multitrack-record system of claim 9 wherein said record circuits record said marker signals as a predetermined sequence of all-zeros and all-ones bytes and said like signal pattern between said marker signals being a plurality of one of said marker signals bytes, said unique characteristic including said marker signals all-ones and all-zeros byte sequence at either end of said resync signals processed during one of said interleaved operations.

11. The record system of claim 9 wherein said data means effects recording of digital signals in blocks along said media with nonrecorded areas separating said blocks, said resync means being operative to record preamble and postamble sets of synchronization signals bracketing each block of data recorded on said record media, said preamble and postamble signals having symmetrical characteristics such that reading in either direction produces identical read-back signals from said preamble and postamble signals, said marker signals being reproduced in said preamble and postamble signals immediately adjacent data recording and having identical characteristics to said marker signals in said resync signals, and said cycling means being capable of using the same control cycle for recording said resync signals and one set of said bracketing signals.

12. The multitrack-record system set forth in claim 1 wherein said cycling means includes means for generating IBG's between a plurality of said record blocks, each said record block being recorded with a set of preamble and postamble synchronization signals bracketing each data block and separated therefrom by a marker signal, respectively;

said preamble and postamble signals having the same signal characteristics such that forward and backward reading can be effected for producing the same signal envelope pattern in either direction;

said cycling means being further operative to record said resynchronization patterns to have the same signal length and characteristics as said preambles and postambles including marker signals bracketing said resync signals which are identical and symmetrical with respect to the marker signals intermediate said preamble, postamble, and said data block such that said resync means is the same signal generating means that generate the preamble and postamble for generating said resynchronization signals.

13. The multitrack record system set forth in claim 1 including a deskewing means in said data means having a number of byte registers, dead-tracking means in said data means capable of inhibiting transfer of data signals to said deskewing means during dead-tracking operations for a given track whereby one digit position in the various registers of said deskewing means receives no signals with zeros being inserted therein, and said resync means upon said interruption making said dead-track indication appear as the most leading track of all tracks in said byte and then operative to look for resync signals from the former dead track and operative to reinitiate date read-back upon detection of satisfactory resync signals.

14. The multitrack-record system set forth in claim 13 wherein one of said byte registers is a reference register in said deskewing apparatus and is adapted to always receive the first byte of data from said data means in each data portion between said resync signals, and said resync means operative to set said deskewing means to said reference state upon completion of said resync signals.

15. The multitrack-record system set forth in claim 1 wherein said control means is operative to effect operation of said data means in forward and backward relative directions of head-media motions, including:

forward/backward-indicating means, format means responsive to said indication for instituting forward and backward types of data signal-processing operations in said data means, said cycling means having a byte count modulus equal to a given number, said date means responsive to said format means and to said forward or backward indications to effect signal-processing operations based upon a byte limit equal to an integral number times said given number of signals and operative, when the total number of signals is not equal to such limit being further responsive to said forward indication, to effect signal-padding operations with respect to said media after data signal exchanging until the signals exchanged with said media are equal to said limit and further responsive to said backward indication to effect signal padding operations before data signal exchanging such that the total number of signals exchanged with said media in a given record equals said limit, means in said format means indicating padding signals, channel-connecting means for exchanging data signals with said data means, and said data means responsive to said padding indication to inhibit exchange of data signals with said channel means.

16. The multitrack-record system set forth in claim 15 wherein said format means includes burst-counting and control means, said burst means having plural stable states respectively indicating burst begin, burst active, and burst end;

said format means including:

steering latch means being responsive to said cycling means and said burst means to indicate burst activity or data activity, and said control means initiating action in said recording and read-back circuits with respect to said data means and said resync means in accordance with said steering latch indication.

17. The multitrack-record system of claim 1 wherein said data means includes deskewing means having a predetermined number of buffer register positions, the improvement further including:

counting means in said cycling means for counting a preset number of data bytes being exchanged with said record media and then interrupting said data means operation for an operation by said resync means for a second preset number of bytes, and the sum of said two preset numbers equaling the number of deskewing positions multiplied by an integer.

18. The multitrack-record system set forth in claim 17, said resync means further operative upon a dead-track indication being received from said data means to force on said deskewing means during resync operation and effect that the track being dead tracked is the most leading track and further operative upon successful resynchronization of circuitry associated with said dead track to reinitiate read-back from said track by supplying data signals to said deskewing apparatus upon completion of said resync operations.

19. The multitrack-record system set forth in claim 18 wherein said record format includes a plurality of record blocks each capable of having resync patterns interleaved among data patterns and each block being separated by a portion of media having no recording thereon and termed an IBG, each block further having preamble and postamble signals with symmetrical characteristics such that reading in either direction produces identical read-back signal patterns from said preamble and postamble signals with marker signals being placed between said block of data and said preamble and postamble signals, and said cycling means using the same control cycle for recording and reading back said resync signals as for said preamble and postamble signals.

20. The multitrack-record system set forth in claim 19 wherein said counting means in said cycling means starts counting only upon occurrence of the marker signal associated with either a preamble or postamble first encountered and is operative for continuously counting throughout the data block until at least detection of a second marker signal associated with the postamble or preamble not first read.

21. A multitrack magnetic-tape system which employs a given number of skew buffers for holding digital signals from a plurality of record tracks having a predetermined maximum number of bit positions of skew, apparatus for recording interleaved resynchronization bursts of signals within recorded digital signals, including the improved combination:

first means for successively recording sets of parallel data signals in respective parallel tracks on a magnetic media, second means for indicating that a certain number of sets of digital signals has been recorded, third means responsive to said indication for interrupting the recording of digital signals and for causing said apparatus to simultaneously record an interleaved resynchronization bursts in each track having a number of signals in each track not less than said predetermined number with like signals recorded in parallel in all tracks.

22. Apparatus in accordance with claim 21 wherein said first means is operative to record signals in groups of permutation codes having a maximum run-length of first signals representing a first data value and second signals representing a second data value, said second means comprising counting means for counting recorded signals, and said third means having write resync means operative to record a burst of signals consisting of maximum run-lengths of said first signals separated by ones of said second signals, and being further operative to record marker signals consisting of one signal group of said permutation code and bracketing said bursts in a symmetrical manner with a maximum run-length of said first signal in each marker signal being recorded adjacent said burst and forming a portion of said burst.

23. Apparatus in accordance with claim 21 which further includes in combination:

fourth means for detecting that the length in numbers of bits per track of recorded digital signals is a number other than an integral multiple of said given number, fifth means responsive to said fourth means for recording padding signals adjacent said digital signals to make the total length thereof in each track an integral multiple of said given number whereby data can be read in forward and backward directions such that data adjacent said interleaved synchronization burst signals enter predictable ones of said skew buffers in either direction of reading.

24. Apparatus in accordance with claim 23 which further includes in combination:

sixth means for recording marker signals having like signals in all tracks intermediate said bursts of signals, padding signals, and digital signals for indicating separation thereof, said marker signals further uniquely identifying a longitudinal position in association with said bursts in each of said tracks.

25. Apparatus in accordance with claim 24 wherein said third means records a resynchronization burst of signals in each track as a string of signals representing a first binary state, said sixth means for recording marker signals at each end of each said resynchronization burst of signals consisting of signals representative of a second binary state adjacent said burst of signals and signal representative of said first binary state bracketing said second state representative signals such that said resynchronization burst is symmetrical along each track with both said marker signals indicating unique track position in conjunction with said resynchronization bursts.

26. Apparatus in accordance with claim 24 further including means for counting a burst of said resynchronization signals being recorded and operative upon completing said count to reactivate said first means to continue recording digital signals, said burst counting means having a modulus of about twice said predetermined number such that each resynchronization burst has about twice the number of bit positions than is in said maximum skew, and means for recording preamble/postamble synchronization bursts, said means being responsive to said burst counting means counting to said modulus to terminate recording of one of said synchronization bursts.

27. Apparatus for reading digital signals recorded on a multitrack magnetic media and having a given number of skew buffers (SKB), each track being self-clocked and having dead-tracking capabilities, said media having recorded interleaved sets of resynchronization signals among recorded digital signals, each set of resynchronization signals only including signals within the bandwidth of said digital signals, the improvement including the combination:

first means for sensing and detecting recorded digital signals in a self-clocking manner, dead track means indicating whether or not dead tracking is occurring in any given track, second means for indicating that a set of resynchronization signals is being encountered and responsive to each set without correlation to any other set to establish resynchronization indicating signals showing skew relationship of signals of said given track to signals from other tracks, third means jointly responsive to said second means indication and to an dead-track indication for determining whether or not digital signals from any given dead track or tracks are again available, and said third means causing digital signals to be read from said given track or tracks whenever a signal from said track or tracks is available and resetting said dead-track means to indicate no dead track.

28. Apparatus in accordance with claim 27 which further includes:

means operatively associated with said dead track means for indicating whether or not digital signals read between any given two successively encountered sets of synchronization signals include digital signals generated by a dead-tracking operation.

29. Apparatus in accordance with claim 27 wherein said resynchronization signals are symmetrical and evenly spaced among each record with padding signals being associated only with a designated set of resynchronization signals further including in combination:

means for indicating that padding signals are being received and and for preventing said padding signals from being transferred as digital signals and counting means having a modulus in accordance with spacing between sets of synchronization signals to indicate when a set is expected to be read.

30. Apparatus in accordance with claim 27 wherein said sets of resynchronization signals are bursts of signals or signal patterns of a number of bit positions in each track greater than said given number and further including:

means waiting until sufficient digital signals in a resynchronization burst or shortly thereafter have been received to approximately fill said SKB before determining that a given dead track has been reactivated or to continue dead-tracking said given track.

31. Apparatus in accordance with claim 30 further including:

buffer registers for receiving digital signals from said SKB and holding same a minimum time before outputting said digital signals, ROC means on said SKB for cycling digital signals to said buffer registers and having said given number of discrete stable signal states, said second means being responsive to said ROC means being in a given stable state after detection of a burst of signals to supply a resync indicating signal and further responsive to said ROC means in a second given stable state after termination of said burst of signals and no acceptable signal from said dead track to reinitiate dead-tracking operations with respect to said dead track.

32. Apparatus in accordance with claim 31 wherein said burst of signals includes a sufficient number of signals to effectively step said ROC means through first and second rotations, said second means being responsive to said given ROC stable state only during said first rotation to start supplying said resync indicating signal and to another ROC state during said first ROC rotation to initiate testing for a signal from any track that was being dead-tracked, and during said second ROC rotation and thereafter until another occurrence of said second stable state being responsive to a signal recovered from an indicated dead track to reactivate data recovery therefrom and remove said resync indicating signal.

33. Apparatus in accordance with claim 32 where each said track has a marker signal recorded at each end of said burst of signals, sad SKB being jointly responsive to detection of a marker signal after detection of said burst of signals and to digital signals being received from a previous dead track to cause insertion of the first received digital signal from such previous dead track into a reference one of said skew buffers (SKB) thereby reestablishing a deskewing relationship between said previous dead track and other tracks on said media.

34. A multitrack magnetic-media-record system having skew accommodation apparatus (SKB) including a readout counter (ROC) which tallies deskewed bytes of digital signals in a count rotation of a certain number of bytes and indicating each count by a stable state, each rotation being indicated by a reference state of ROC, said system performing data-processing operations on signals including recording and reproducing signals from a magnetic media, the improvement including in combination:

recording means for recording digital signals on said media in a format including recording identifying signals in each track spaced apart along the length of said media a predetermined number of ROC tally rotations, and read-back means for reproducing said signals from said media wherein said ROC tally rotation passes said reference state in a predetermined timing relation with read-back of said identifying signals.

35. Apparatus in accordance with claim 34 further including:

resync means in said recording and read-back means for recording and reproducing said identifying signals as bursts of like signals separated from said digital signals by marker signals, said SKB being responsive to said resync means to insert a first-received data signal after a marker signal in a predetermined location therein, counting means in said resync means to effect recording a burst of signals including said marker signals of two rotations of said ROC, and further means operative to record beginning and ending synchronization bursts having a number of signals equal to approximately the number of counts in two ROC rotations.

36. The apparatus as in claim 34 wherein said read-back means includes rotation-counting means responsive to said reference state for metering recorded signal format on said media.

37. Apparatus as in claim 36 further including operation-determining means responsive to said rotation counting means for selectively enabling a data-processing operation in accordance with the number of rotations counted in said rotation-counting means.

38. Apparatus in accordance with claim 34 further including in combination:

means in said recording means to terminate recording only upon detection of a given one of said stable states and having padding means for recording padding signals between a last-recorded digital signal and a record position in the tracks corresponding to said one ROC stable state.

39. Apparatus in accordance with claim 38 wherein said identifying signals are recorded as a burst of first signals in all tracks bracketed by a signal pattern of said first signals in all tracks with at least one second signal in each track for identifying ends of such first signal burst, and further recorded as beginnings and endings bursts, said padding means recording a burst of said second signals intermediate recording ones of said first signals whereby a marker signal between the last recorded digital signal and said endings bursts is interrupted by said padding signals.

40. Digital signal record resynchronization for a multitrack-recording system having record tracks on a media subject to skew a predetermined maximum number of bit positions, the system having a given number of skew buffers for holding data signals from said data tracks, said given numbers being at least as large as said predetermined number, a byte being a group of signals simultaneously recorded on said media in each of said tracks, the improvement including the combination:

means for recording bytes of digital signals on a magnetic media including counting means for counting and indicating the number of bytes recorded, means responsive to said indication for interrupting the recording of digital signals to simultaneously record a burst of resynchronization signals in each track having a length not less than said predetermined number and for reinitiating recording of said digital signals upon completing recording said burst, means responsive to said indication and to said interrupting means to cause recording marker signal bytes indicating separation of said synchronization signals and said digital signals, read-back means including said skew buffers, dead-track-detecting means in said read-back means for inhibiting operation of that portion of said read-back means operatively associated with a track not supplying signals of a given quality and means capable of detecting said resynchronization signals, resynchronization means jointly responsive to said dead-track indication and detection of said resynchronization signals to initiate resynchronization activity including the sensing of said resynchronization signal bursts for resynchronizing said readout means to said dead track whereby data can be read from said track upon the completion of the reading of a burst of synchronization signals, and means responsive to said resynchronization means to initiate a readout operation upon the detection of a predetermined portion of said burst of resynchronization signals being greater than said predetermined maximum number.

41. The method of queuing a given dead-tracked self-clocking data track in a skew buffer-receiving digital signals from other record tracks in a plural record track recording/read-back system, said system capable of exhibiting a maximum given skew during operations and having a given number of skew buffers for accommodating said given maximum skew, the magnetic record having sets of digital signals with interleaved resynchronizing signals, the resynchronizing signals exhibiting a unique characteristic identifying an actual position in the respective tracks, the method including the following steps in combination:

initiating a reestablishment of self-clocking in said given data track, attempting to read signals from said given record track after said initiation of reestablishment of self-clocking, and upon detection of said resynchronization signals, presetting a deskewing of said tracks by effectively assigning said given record track a predetermined leading relationship with respect to digital signals in said skew buffers from said other record tracks, causing readout of said skew buffers when one or the other of the following first occurs:

a. digital signals detected from all said tracks are lodged in said skew buffer, or b. said given record track reaches maximum-lagging skew in said skew buffer with respect to data signals from any of said other data tracks, and upon detection of (a), establishing read-back operations in a said given record track or, upon detection of (b), continuing dead-tracking said given record track.

42. The method of claim 41 wherein said leading relationship is established by indicating resynchronization of said given record track at or before maximum leading skew and then permitting said skew buffers to process signals until any one of said other record tracks has reached a maximum-leading skew position with respect to said given record track.

43. The method of claim 42 wherein said leading skew relation is selected to be greater than said lagging skew relation.

44. The method of recording a block of digital signals on a multitrack record media subject to skewing, one byte consisting of a signal recorded simultaneously in each track, the improvement including the following steps to record digital data signals in sets within said block and recording resynchronization signals contiguously with said sets, recording said resynchronization signals simultaneously in all tracks and generating a signal characteristic unique thereto whereby positional relationships between said tracks are indicated by a predetermined number of successive bytes of said resynchronization signals, recording said signal characteristic to be identifiable without reference to any other signal recorded on said media, and including frequency/wavelength characteristics in said resynchronization signals limited to and included in said digital signal frequency/wavelength characteristics.

45. The method of recording a self-resynchronizing block of magnetic multitrack record, including the following steps in combination:

recording a set of digital signal bytes as a continuous signal in each track and having successive signal state changes having predetermined signal, phase and frequency components, then continuing to record said signal bytes as a plurality of bytes of resynchronization signals including said predetermined signal, phase, and frequency components plus a unique synchronizing signal byte characteristic for indicating an actual position in said magnetic record of signals in each and every track with respect to signals in each and every other track, and repeating said recording steps until all digital signals have been recorded in a continuous manner in the respective tracks for said block.

46. The method set forth in claim 45 further including the following steps, recording said bytes in NRZI techniques combined with *n*-bit-permutation code group techniques, wherein *n* is a given integer, recording a set of said digital signal bytes as a plurality of said code groups, limiting recording in each track to no more than a given number of bit positions in a row with no signal state changes to form a maximum duration one-half wavelength, L, and recording said bytes of resynchronization signals as a plurality of said code group bytes having first and last code groups each with said L one-half wavelength at one end thereof and recording additional code group bytes intermediate said first and last groups such that successive ones of said L one-half wavelengths create a continuous sequence of a plurality of successive L one-half wavelengths including said first and last code group L one-half wavelengths.

47. The method set forth in claim 45 wherein said multitrack record is subject to skew a given number of signal positions on the record such that signals recovered from said record have to be deskewed to reconstitute signal bytes, one signal position corresponding to recording one signal byte, the improved recording method further including in combination:

recording one of said plurality of bytes of resynchronization signals and one of said sets of digital signals such that the total number of said signal positions therein equals an integral multiple of said given number.

48. The method of queueing a given dead-tracked self-clocking data track into a skew buffer system which receives digital signals from other active record tracks of a plural record track recording/read-back system, said system capable of exhibiting a maximum skew during operations and having a given number of skew buffers for accommodating such skew, the magnetic record having sets of digital signals with interleaved resynchronizing signals with the resynchronizing signals exhibiting unique characteristics identifying an actual position in the respective tracks and extending across all of the tracks for indicating a reference position in said tracks, the method including the following steps in combination:

detecting said resynchronization signals in at least one of said active tracks, then attempting to reestablish self-clocking in said given data track while simultaneously effecting a leading track position in said skew buffers for said dead track and continuing to reestablish self-clocking until at least said dead track appears in the skew buffers as the most-lagging track with respect to said one active track.

49. The method set forth in claim 48 wherein said skew buffer has reference positions into which first data signals are read after said respective resynchronization signals in the respective tracks and having readout-cycling means for reading out deskewed data bytes, the combination of steps further including:

holding said cycle means at a reference position corresponding to said skew buffer reference positions during said reestablishment of self-clocking of said given record track until self-clocking has been reestablished by detection of a resynchronization signal in said given record track and inserting a first data signal into the skew buffers from the given record track and all other active tracks having a lagging relationship to said given track, and upon insertion of all such data signals, reinitiating operation of said readout-cycling means from said reference position.

50. The method set forth in claim 48 wherein said skew buffers have a readout tally, upon detection of said resynchronization signals in any track, maintaining the tally increase for each bit period of a read-back signal in the most-lagging active track until a resynchronization signal from the most-lagging track is supplied to said skew buffer and then holding the tally until all tracks, including said given track, have supplied a first data signal following such resynchronization signals to said skew buffers, or until said given track has not supplied a given data signal to said skew buffer when in the most-lagging position.

51. The method set forth in claim 50 whereupon detecting said given track being in the most-lagging position reinitiating dead tracking in said given track irrespective of the signals received therefrom.

52. The system set forth in claim 51 wherein said burst means includes a burst counter having a modulus greater than said given number and a burst count decoder responsive to the count in said burst counter to effect a burst operation slightly less than the modulus of said counter and instituting marker signal generation in said marker signal means equal to the difference of said burst count and said given modulus and interrupting the cycling means upon reaching said given modulus, said cycling means being responsive to the interruption to initiate another data signal byte-exchanging operation.

53. The system set forth in claim 52 wherein a binary 1 is a given record media state change in a record cell and a binary 0 is other than said given record media state change in a record cell, further including an all-1's- and an all-0's-generating means for simultaneously recording either all 0's or all 1's in each of the tracks and being responsive to said burst-decoder means and said mark-generating means for recording successions of all 0's and all 1's for respectively generating synchronization burst and marker signals.

54. The apparatus as set forth in claim 53 further including a number of buffer registers interposed between said channel-exchanging means and said deskewing buffers, said buffers operative to provide a delay from the deskewing buffers to said channel-exchanging means and all-1's- and all-0's-detecting means responsive to a last 1 of said buffer registers for indicating detection of a marker signal, and said all-1's- and all-0's-detecting means operative to interrupt said cycling means for changing operations between a data signal-exchanging operation and a resynchronization signal-exchanging operation.

55. The system set forth in claim 52 wherein said byte counter has a first modulus, said burst count decoder is operative with a second modulus with the sum of the two modulus being a given number, and deskewing means operative with said data signal-exchanging means having a number of skew buffers in accordance with the maximum expected skew of said system with said given number being an integral multiple of the number of said skew buffers.

56. The multitrack-recording system set forth in claim 55 further including means in said cycling means for interrupting said byte counter during the recording of data for instituting operation of said marker signal-generating means and said burst signal-generating means for terminating the block of data signals, and channel connecting means operative to receive command signals from another system and responsive to certain ones of said command signals for interrupting said byte counter means.

57. A multitrack-recording system adapted to process signals for exchanging same with a record media relatively movable with respect to a transducer wherein signals on such media are recorded in records or blocks of signals separated by erased gaps or IBG's, the improvement including in combination:

byte-counting means of a first number for counting the number of data signal bytes exchangeable with said media as a set of bytes, burst means for counting signal bytes exchanged with said media for effecting recording of synchronization and resynchronization bursts, having a second-number modulus, as bursts of like signals in all tracks, marker-generator means in said burst means for recording first and second marker signals of like signals on all tracks immediately adjacent bursts of said synchronization and resynchronization signals, cycling means operative during a signal-processing operation to first initiate operation of said burst means for effecting a preamble operation followed by a first marker signal operation; then secondly effecting operation of said byte counter means for exchange of said first number of data bytes with said media; thirdly, in response to said byte-counting means counting said first modulus to interrupt data byte exchanging for recording a second marker signal followed by a burst of signals followed by a first marker signal, and then repeating said second and third steps until all data bytes have been recorded with the last set of data bytes having up to said first number of bytes, and then effecting said marker signal generator means to record said second marker signal followed by a burst, and then terminating the operation.

58. A new article comprising, an elongated magnetic media having a plurality of parallel longitudinal tracks formed in blocks longitudinally separate by erased portions (IBG's), each block comprising:

magnetically recorded signals disposed in each track in sets of a predetermined number of signal bit portions, and resynchronization bursts of signal portions disposed in all of said tracks including symmetrically disposed marker signals identifying location on the media of all tracks, each track thus being located with respect to other tracks.

59. The method of queueing a given dead-tracked self-clocking data track into a skew buffer system which receives digital signals from other active record tracks of a plural record track recording/read-back system, said system capable of exhibiting a maximum skew during operations and having a given number of skew buffers for accommodating such skew, the magnetic recording having sets of digital signals with interleaved resynchronizing signals with the resynchronizing signals exhibiting unique characteristics identifying an actual position in the respective tracks and extending across all of the tracks for indicating a reference position in said tracks, the method including the following steps in combination:

detecting said resynchronization signals in at least one of said active tracks, then forcing said given dead track to a leading track position in said skew buffers and attempting to reestablish self-clocking for said given dead track using resynchronization signals supposedly recorded therein in parallel to said resynchronization signals in said one active track.

* * * * *

930-4008-00D
PO-1050
(5/69)

UNITED STATES PATENT OFFICE
CERTIFICATE OF CORRECTION

Patent No. 3,641,534 Dated February 8, 1972

Inventor(s) JOHN W. IRWIN

It is certified that error appears in the above-identified patent and that said Letters Patent are hereby corrected as shown below:

Column 2, line 10, "such" should read -- data --.

Column 3, between lines 39 and 40, insert the following:
--FIGURE 12 is a simplified diagram of an ROC rotation controlled data location feature of this invention.-- immediately following the above insert, add the following heading: --DETAILED DESCRIPTION OF THE PREFERRED EMBODIMENT--

Column 7, line 10, "not" should read --now--.

line 41, "includes" should read --included--.

Column 10, line 11, delete "embodiment" (first occurrence).

Column 13, line 29, after "satisfactory" insert --signals. In case three tracks are not supplying satisfactory--.

Column 14, line 14, "delivered" should read --derived--.

line 50, "transistor" should read --transfer--.

line 60, delete "more".

Column 15, line 39, "stop" should read --step--.

line 48, delete "cycle" (first occurrence).

Column 16, line 20, "72" should read --74--.

930-4008-00D
PO-1050
(5/69)

UNITED STATES PATENT OFFICE
CERTIFICATE OF CORRECTION

Patent No. 3,641,534 Dated February 8, 1972

Inventor(s) JOHN W. IRWIN

It is certified that error appears in the above-identified patent and that said Letters Patent are hereby corrected as shown below:

Column 17, line 11, "all-2's" should read --all-1's--.
line 48, "is" (second occurrence) should read --its--.
line 63, "terminal" should read --terminate--.

Column 22, line 59, "resetting" should read --setting--.

Column 25, line 26, "an" should read --any--.

Column 32, line 49, "bursts" should read --burst--.

Column 33, line 20, after "and" insert --a--.
line 57, "an" should read --any--.

Column 34, line 48, "sad" should read --said--.

Signed and sealed this 4th day of July 1972.

(SEAL)
Attest:

EDWARD M.FLETCHER,JR.
Attesting Officer

ROBERT GOTTSCHALK
Commissioner of Patents